United States Patent
Maleki et al.

(10) Patent No.: US 11,675,078 B2
(45) Date of Patent: Jun. 13, 2023

(54) LIDAR SYSTEM

(71) Applicant: GM GLOBAL TECHNOLOGY OPERATIONS LLC, Detroit, MI (US)

(72) Inventors: Lutfollah Maleki, Pasadena, CA (US); Scott Singer, San Gabriel, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1134 days.

(21) Appl. No.: 16/236,426

(22) Filed: Dec. 29, 2018

(65) Prior Publication Data

US 2019/0154832 A1 May 23, 2019

Related U.S. Application Data

(63) Continuation of application No. 16/313,247, filed as application No. PCT/US2016/055778 on Oct. 6, 2016.

(51) Int. Cl.
*G01S 17/36* (2006.01)
*G01S 7/4911* (2020.01)
*G01S 7/481* (2006.01)
*G01S 17/58* (2006.01)
*G01S 17/34* (2020.01)

(52) U.S. Cl.
CPC ............ *G01S 17/36* (2013.01); *G01S 7/4817* (2013.01); *G01S 7/4911* (2013.01); *G01S 17/34* (2020.01); *G01S 17/58* (2013.01)

(58) Field of Classification Search
USPC ...................................................... 356/5.01
See application file for complete search history.

(56) References Cited

U.S. PATENT DOCUMENTS

| 4,721,385 A | 1/1988 | Jelalian et al. |
| 5,000,567 A | 3/1991 | Fleshner |
| 6,249,591 B1 | 6/2001 | Tullis |

(Continued)

FOREIGN PATENT DOCUMENTS

WO  2018067158 A1  4/2018

OTHER PUBLICATIONS

"Notice of Allowance and Fees Due for U.S. Appl. No. 16/313,247", dated Jul. 20, 2022, 9 pages.

(Continued)

*Primary Examiner* — James R Hulka
(74) *Attorney, Agent, or Firm* — Calfee, Halter & Griswold LLP

(57) ABSTRACT

A light detection and ranging ("LiDAR") system includes a coherent light source that generates a frequency modulated optical signal comprising a series of optical chirps. A scanning assembly transmits the series of optical chirps in a scan pattern across a scanning region, and receives a plurality of reflected optical chirps corresponding to the transmitted optical chirps that have reflected off one or more objects located within the scanning region. A photodetector mixes the reflected optical chirps with a local oscillation (LO) reference signal comprising a series of LO reference chirps. An electronic data analysis assembly processes digital data derived from the reflected optical chirps and the LO reference chirps mixed at the photodetector to generate distance data and optionally velocity data associated with each of the reflected optical chirps.

13 Claims, 19 Drawing Sheets

(56) References Cited

U.S. PATENT DOCUMENTS

| | | | |
|---|---|---|---|
| 6,654,401 | B2 | 11/2003 | Cavalheiro et al. |
| 7,280,176 | B2 | 10/2007 | Ionov |
| 7,280,186 | B1 | 10/2007 | Ionov |
| 7,312,855 | B1 | 12/2007 | Hintz et al. |
| 7,511,824 | B2 | 3/2009 | Sebastian et al. |
| 7,742,152 | B2 | 6/2010 | Hui et al. |
| 7,986,397 | B1 | 7/2011 | Tiemann et al. |
| 8,417,076 | B2 | 4/2013 | Maleki et al. |
| 8,605,760 | B2 | 12/2013 | Liang et al. |
| 8,928,865 | B2 | 1/2015 | Rakuljic |
| 8,948,497 | B2 | 2/2015 | Sebastian et al. |
| 9,201,028 | B2 | 12/2015 | Pauly |
| 9,575,184 | B2 | 2/2017 | Gilliland et al. |
| 9,851,433 | B2 * | 12/2017 | Sebastian ............. G01S 7/4814 |
| 10,168,429 | B2 | 1/2019 | Maleki et al. |
| 10,203,399 | B2 | 2/2019 | Retterath et al. |
| 10,345,447 | B1 | 7/2019 | Hicks |
| 10,359,504 | B2 | 7/2019 | Fetterman et al. |
| 10,598,770 | B2 * | 3/2020 | Singer .................... G01S 17/26 |
| 10,605,899 | B2 * | 3/2020 | Singer .................. G01S 17/931 |
| 10,877,131 | B2 * | 12/2020 | Singer .................... G01S 17/50 |
| 11,320,514 | B2 | 5/2022 | Keller et al. |
| 11,442,149 | B2 * | 9/2022 | Maleki .................. G01S 17/34 |
| 2002/0018494 | A1 | 2/2002 | Vieira et al. |
| 2002/0149585 | A1 * | 10/2002 | Kacyra .................. G01S 17/89 |
| | | | 345/428 |
| 2003/0151711 | A1 | 8/2003 | Yuh et al. |
| 2004/0051711 | A1 * | 3/2004 | Dimsdale .............. G01B 11/24 |
| | | | 345/419 |
| 2006/0203224 | A1 | 9/2006 | Sebastian et al. |
| 2007/0291804 | A1 * | 12/2007 | Day ........................ G02B 3/00 |
| | | | 372/36 |
| 2008/0018881 | A1 | 1/2008 | Hui et al. |
| 2008/0024756 | A1 | 1/2008 | Rogers |
| 2009/0030605 | A1 * | 1/2009 | Breed .................. G05D 1/0274 |
| | | | 340/901 |
| 2009/0140887 | A1 * | 6/2009 | Breed .................. G01S 13/865 |
| | | | 701/116 |
| 2012/0039346 | A1 | 2/2012 | Liang et al. |
| 2012/0194893 | A1 | 8/2012 | Maleki et al. |
| 2013/0044311 | A1 | 2/2013 | Rakuljic |
| 2013/0088705 | A1 * | 4/2013 | Asahara ................. G01S 17/58 |
| | | | 356/28.5 |
| 2014/0064555 | A1 | 3/2014 | Sebastian et al. |
| 2014/0269792 | A1 * | 9/2014 | Ota .......................... H01S 3/11 |
| | | | 372/25 |
| 2015/0131080 | A1 | 5/2015 | Retterath et al. |
| 2015/0168137 | A1 | 6/2015 | Pauly |
| 2015/0177367 | A1 | 6/2015 | Sebastian et al. |
| 2016/0003946 | A1 | 1/2016 | Gilliland et al. |
| 2016/0291156 | A1 * | 10/2016 | Hjelmstad ............... G01S 17/42 |
| 2016/0299228 | A1 | 10/2016 | Maleki et al. |
| 2016/0341818 | A1 * | 11/2016 | Gilliland ............... G01S 17/931 |
| 2016/0356890 | A1 * | 12/2016 | Fried ..................... G01S 7/4863 |
| 2018/0031678 | A1 * | 2/2018 | Singer .................. G01S 17/931 |
| 2018/0095162 | A1 | 4/2018 | Fetterman et al. |
| 2018/0275248 | A1 * | 9/2018 | Bailey ..................... G01S 17/36 |
| 2019/0094366 | A1 * | 3/2019 | Maleki .................... G01S 17/34 |
| 2019/0107606 | A1 * | 4/2019 | Russell .................. G01S 7/4865 |
| 2019/0137608 | A1 * | 5/2019 | Singer ...................... G01S 17/50 |
| 2019/0154835 | A1 | 5/2019 | Maleki et al. |
| 2019/0170855 | A1 | 6/2019 | Keller et al. |
| 2019/0195688 | A1 * | 6/2019 | Atabaki ..................... G01J 3/44 |
| 2019/0302268 | A1 * | 10/2019 | Singer ..................... G01S 7/491 |
| 2019/0302269 | A1 * | 10/2019 | Singer ................... G01S 7/4918 |
| 2019/0331797 | A1 * | 10/2019 | Singer ..................... G01S 7/497 |
| 2020/0132814 | A1 * | 4/2020 | Singer ..................... G01S 17/87 |
| 2020/0182978 | A1 | 6/2020 | Maleki et al. |
| 2020/0200903 | A1 * | 6/2020 | Singer .................. G01S 17/931 |
| 2020/0200904 | A1 * | 6/2020 | Singer .................. G01S 17/931 |
| 2020/0209358 | A1 * | 7/2020 | Maleki .................... G01S 7/497 |

OTHER PUBLICATIONS

"Response to the Office Action for U.S. Appl. No. 16/313,247", filed Jun. 28, 2022, 12 pages.

"International Search Report and Written Opinion for PCT Patent Application No. PCT/US2016/055778", dated May 31, 2017, 18 pages.

Dale, et al., "Ultra-Narrow Line Tunable Semiconductor Lasers for Cohe Rent LIDAR Applications", In Imaging Systems and Applications, Jul. 13, 2014, 3 pages.

"Office Action for U.S. Appl. No. 16/313,247", dated Mar. 3, 2022, 10 pages.

"Office Action for European Patent Application No. 16918438.9", dated May 14, 2019, 4 pages.

"Office Action for European Patent Application No. 16918438.9", dated Jun. 17, 2020, 1 page.

"Response to the Office Action for European Patent Application No. 16918438.9", Filed Date: Dec. 21, 2020, 15 pages.

"Office Action for U.S. Appl. No. 16/235,640", dated May 17, 2022, 18 pages.

"Response to the Office Action for U.S. Appl. No. 16/235,640", filed Mar. 9, 2022, 5 pages.

Stoehr, et al., "Diode Laser With 1 HZ Linewidth", In Optics Letters, vol. 31, No. 6, Mar. 15, 2006, pp. 736-738.

"European Search Report for European Patent Application No. 16918438.9", dated May 28, 2020, 8 Pages.

"Office Action for United States U.S. Appl. No. 16/235,640", dated Jan. 4, 2022, 14 pages.

Ilchenko, et al., "Compact Tunable kHz-Linewidth Semiconductor Laser Stabilized With a Whispering-Gallery Mode Microresonator", SPIE LASE, 2011, 9 pages.

"Corrected Notice of Allowability for U.S. Appl. No. 16/313,247", dated Aug. 17, 2022, 3 pages.

"Corrected Notice of Allowability for U.S. Appl. No. 16/313,247", dated Jul. 29, 2022, 2 pages.

"Final Office Action for U.S. Appl. No. 16/235,640", dated Nov. 16, 2022, 18 pages.

"Office Action for European Patent Application No. 16918438.9", dated Dec. 16, 2022, 7 pages.

"Response to the Office Action for U.S. Appl. No. 16/235,640", filed Aug. 17, 2022, 12 pages.

* cited by examiner

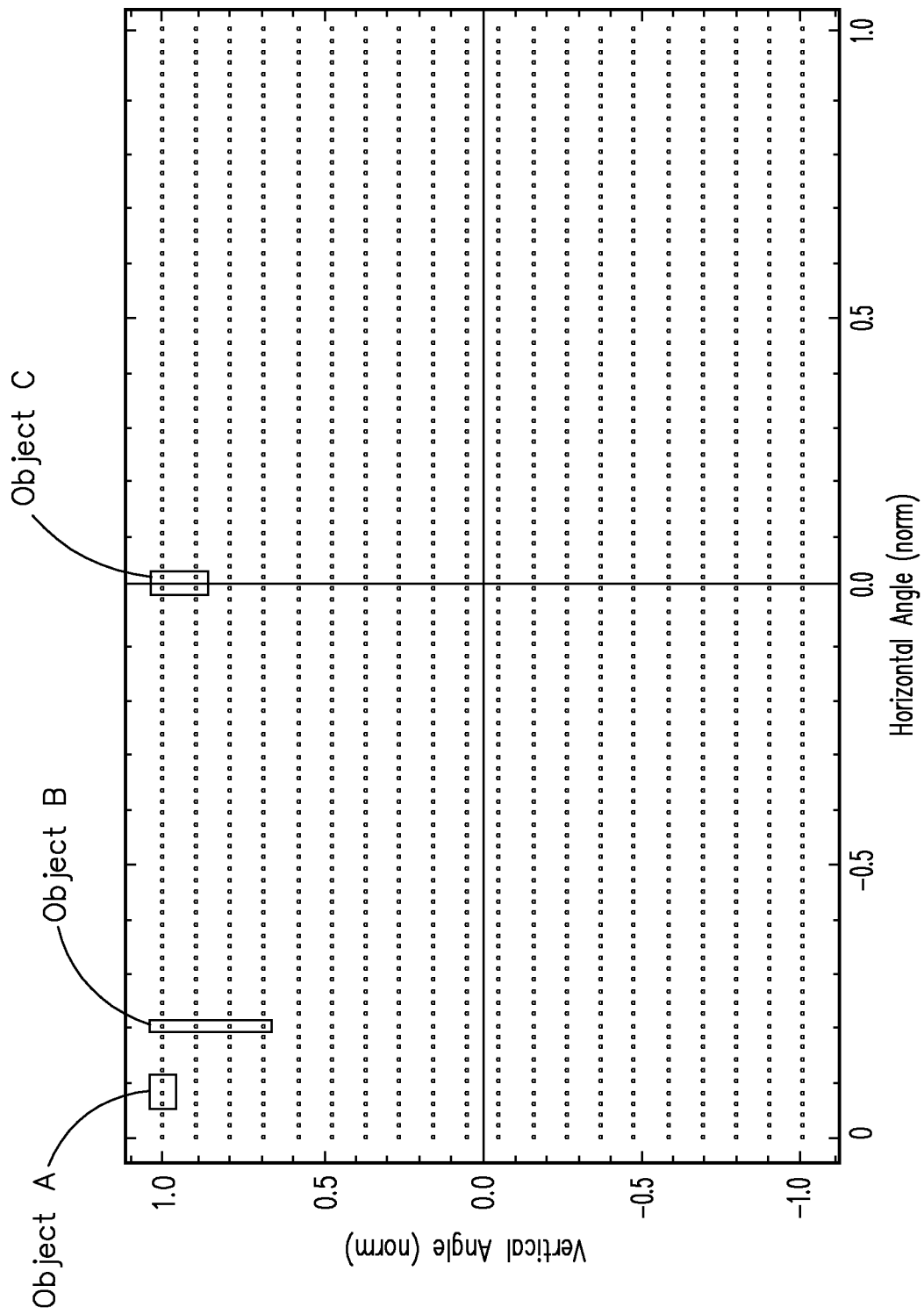

LIDAR SYSTEM

RELATED APPLICATIONS

This application is a continuation of U.S. patent application Ser. No. 16/313,247, filed on Dec. 26, 2018, and entitled "LIDAR SYSTEM", which is a U.S. National Stage Application under 35 U.S.C. § 371 of PCT Application No. PCT/US2016/055778, filed on Oct. 6, 2016, and entitled "LIDAR SYSTEM". The entireties of these applications are incorporated herein by reference.

BACKGROUND

Light detection and ranging ("LiDAR") systems have been developed for use in autonomous or semi-autonomous vehicles, drones, and other applications that require laser scanning capabilities. One type of LiDAR system is a time of flight ("ToF") LiDAR system in which a transmitter emits short pulses of light that reflect off a target object and a receiver receives the reflected pulses. The delay between emission and reception provides a measure of the distance between the transmitter and the target object. ToF LiDAR systems may also determine the velocity of the target object by comparing two frames of data (i.e., the object must be identified at least twice) and calculating the shift in position of the object. A number of different companies have attempted to develop and/or market ToF LiDAR systems for automotive applications, including Velodyne LiDAR, Ibeo Automotive Systems GmbH, and Quanergy Systems, Inc.

Alternatives to ToF LiDAR systems have also been developed. For example, a frequency modulated continuous wave (FMCW) LiDAR system includes a laser source to generate a frequency modulated (FM) optical signal that comprises a continuous series of optical "chirps" in which the instantaneous frequency within each chirp varies with time. A transmitter is used to transmit the optical chirps across an environment, and a receiver is used to receive the optical chirps that have reflected off objects located in the environment. Measurement of the frequency shift and/or phase shift of each reflected optical chirp relative to a reference optical chirp provides a measure of the distance and/or velocity of the reflective objects relative to the system. An example of an FMCW LiDAR system is described in U.S. Pat. No. 9,310,471 assigned to HRL Laboratories, LLC. The configuration and performance characteristics of this LiDAR system (including a wide laser linewidth of 400 kHz, poor chirp linearity, and limited range, range resolution and pixel rate) are not ideal for certain implementations. Other types of FMCW LiDAR systems have also been developed that use relatively large laser sources and, as a result, the systems are large, complex, and expensive. As such, FMCW LiDAR systems have seen limited implementation relative to ToF LiDAR systems.

While conventional ToF and FMCW LiDAR systems have been used in various implementations, there is a need for a LiDAR system that provides performance characteristics and other advantages that are not achievable with these conventional systems. In particular, there is a need for a LiDAR system with low optical power that can be used to detect objects located at a great distance and/or traveling at a high speed relative to the LiDAR system and that can be packaged as a solid state sensor for use in automotive and other applications.

SUMMARY

The present invention is directed to a light detection and ranging ("LiDAR") system that provides performance characteristics and other advantages that are not achievable with conventional ToF and FMCW LiDAR systems.

In a first aspect of the invention, a LiDAR system is provided that is relatively immune from interference caused by other LiDAR systems operating nearby. The LiDAR system includes a coherent light source that generates a frequency modulated optical signal comprising a series of optical chirps. The coherent light source has a narrow linewidth, e.g., a linewidth of about 100 kHz or less, 50 kHz or less, 10 kHz or less, 1 kHz or less, 100 Hz or less, or 1 Hz or less. The LiDAR system also includes a scanning assembly that (a) transmits the series of optical chirps in a scan pattern across a scanning region and (b) receives a plurality of reflected optical chirps corresponding to the transmitted optical chirps that have reflected off one or more objects located within the scanning region. In addition, the LiDAR system includes a photodetector that mixes the reflected optical chirps with a local oscillation (LO) reference signal comprising a series of LO reference chirps. Further, the LiDAR system includes an electronic data analysis assembly that processes digital data derived from the reflected optical chirps and the LO reference chirps mixed at the photodetector to generate distance data and optionally velocity data associated with each of the reflected optical chirps. In this implementation, the probability of interference between the transmitted optical chirps and optical chirps transmitted by other LiDAR systems is less than $1 \times 10^{-7}$.

In a second aspect of the invention, the LiDAR system is provided in the form of a sensor that is compact and lightweight and, in addition, provides solid state reliability and environmental tolerance. The LiDAR sensor includes a single coherent light source that generates a frequency modulated optical signal comprising a series of optical chirps. The LiDAR sensor also includes a single scanner that (a) transmits the series of optical chirps in a scan pattern across a scanning region and (b) receives a plurality of reflected optical chirps corresponding to the transmitted optical chirps that have reflected off one or more objects located within the scanning region. In addition, the LiDAR sensor includes a photodetector that mixes the reflected optical chirps with a local oscillation (LO) reference signal comprising a series of LO reference chirps generated by the coherent light source. Optionally, the LiDAR sensor includes an electronic data analysis assembly that processes digital data derived from the reflected optical chirps and the LO reference chirps mixed at the photodetector to generate distance data and optionally velocity data associated with each of the reflected optical chirps. In this implementation, the components are provided in a volume between 10 cm$^3$ and 500 cm$^3$.

In a third aspect of the invention, the LiDAR system generates, transmits and receives light at a rate that enables data points to be processed at a high output rate (i.e., pixel rate) so as to increase the point density on each object of interest. In one embodiment, the LiDAR system includes a coherent light source that generates a frequency modulated optical signal comprising a series of optical chirps each of which is highly linear, e.g., the chirp linearity is 80%, 90%, 95% or more. This high chirp linearity is achieved without predistortion or feedback correction to ensure linearization of the frequency chirps, i.e., the coherent light source inherently provides the desired chirp linearity. The LiDAR system also includes a scanning assembly that (a) transmits the series of optical chirps in a scan pattern across a scanning region and (b) receives a plurality of reflected optical chirps corresponding to the transmitted optical chirps that have reflected off one or more objects located within the scanning region. In addition, the LiDAR system includes a photodetector that mixes the reflected optical chirps with a local oscillation (LO) reference signal comprising a series of LO reference chirps. Further, the LiDAR system includes an electronic data analysis assembly that processes digital data derived from the reflected optical chirps and the LO reference chirps mixed at the photodetector to generate distance data and optionally velocity data associated with each of the reflected optical chirps. In this implementation, the data points are processed at an output rate in the range of 50,000 to 500,000 points/second.

In a fourth aspect of the invention, the LiDAR system is able to detect objects located a great distance from the system while transmitting light at a relatively low level of optical power. In one embodiment, the LiDAR system includes a coherent light source that generates a frequency modulated optical signal comprising a series of optical chirps. The LiDAR system also includes a scanning assembly that (a) transmits the series of optical chirps in a scan pattern across a scanning region at an optical power in the range of 10 mW to 3 W and (b) receives a plurality of reflected optical chirps corresponding to the transmitted optical chirps that have reflected off one or more objects located within the scanning region. Each of the objects is detectable at a distance of 200 meters or more (e.g., up to 1 kilometer) depending on the reflectivity of the object and the transmitted optical power. In addition, the LiDAR system includes a photodetector that mixes the reflected optical chirps with a local oscillation (LO) reference signal comprising a series of LO reference chirps. Further, the LiDAR system includes an electronic data analysis assembly that processes digital data derived from the reflected optical chirps and the LO reference chirps mixed at the photodetector to generate distance data and optionally velocity data associated with each of the reflected optical chirps.

In a fifth aspect of the invention, the LiDAR system is able to directly measure both distance and velocity of an object in real time, which provides significantly lower latency. The LiDAR system includes a coherent light source that generates a frequency modulated optical signal comprising a series of optical chirps. The LiDAR system also includes a scanning assembly that (a) transmits the series of optical chirps in a scan pattern across a scanning region and (b) receives a plurality of reflected optical chirps corresponding to the transmitted optical chirps that have reflected off one or more objects located within the scanning region. In addition, the LiDAR system includes a photodetector that mixes the reflected optical chirps with a local oscillation (LO) reference signal comprising a series of LO reference chirps. Further, the LiDAR system includes an electronic data analysis assembly that processes digital data derived from the reflected optical chirps and the LO reference chirps mixed at the photodetector to generate both distance data and velocity data associated with each of the reflected optical chirps. In this implementation, the point-to-point latency between successive data points is in the range of 220 μs to 100 ms.

In a sixth aspect of the invention, the LiDAR system provides an adaptive scanning function. In one embodiment, the LiDAR system includes a coherent light source that generates a frequency modulated optical signal comprising a series of optical chirps. The LiDAR system also includes a scanning assembly that (a) transmits the series of optical chirps in a scan pattern across a scanning region and (b) receives a plurality of reflected optical chirps corresponding to the transmitted optical chirps that have reflected off one or more objects located within the scanning region. In addition, the LiDAR system includes a photodetector that mixes the reflected optical chirps with a local oscillation (LO) reference signal comprising a series of LO reference chirps. Further, the LiDAR system includes an electronic data analysis and control assembly that processes digital data derived from the reflected optical chirps and the LO reference chirps mixed at the photodetector to generate distance data and optionally velocity data associated with each of the reflected optical chirps. The electronic data analysis and control assembly also generates the scan pattern to be used by the scanning assembly based on one or more scan parameters. The scan parameters may identify the frame size (e.g., a full frame size or a reduced frame size), the spatial resolution (e.g., the number of scan lines and number of pixels per scan line) for the identified frame size, and a non-zero offset for the reduced frame size (e.g., the displacement of the reduced frame size relative to the full frame size in at least one dimension such that the reduced frame size is not centered with respect to the full frame size). As such, coarse scanning may be used to locate one or more objects of interest in the full frame size and fine scanning may be used on certain objects of interest in the reduced frame size resulting in greater point density on objects of interest and better spatial resolution at a distance. Adaptive scanning may also be used beyond adaptive frame placement, e.g., it is possible to implement adaptive chirp repetition rate, chirp bandwidth, chirp configuration, dedication of additional processing power, and other parameters.

In a seventh aspect of the invention, the LiDAR system is eye safe by virtue of its laser wavelength in the range of 1400 nm to 4000 nm (e.g., the C-band of 1530 nm to 1560 nm) in combination with a lower transmitted optical power. The LiDAR system includes a coherent light source that generates a frequency modulated optical signal comprising a series of optical chirps. The LiDAR system also includes a scanning assembly that (a) transmits the series of optical chirps in a scan pattern across a scanning region at an optical power in the range of 10 mW to 3 W and (b) receives a plurality of reflected optical chirps corresponding to the transmitted optical chirps that have reflected off one or more objects located within the scanning region. In addition, the LiDAR system includes a photodetector that mixes the reflected optical chirps with a local oscillation (LO) reference signal comprising a series of LO reference chirps. Further, the LiDAR system includes an electronic data analysis assembly that processes digital data derived from the reflected optical chirps and the LO reference chirps mixed at the photodetector to generate a plurality of data points each of which comprises distance data and optionally velocity data associated with one of the reflected optical chirps. In this implementation, the data points may be processed at an output rate in the range of 50,000 to 500,000 points/second.

Additional aspects of the invention, together with the advantages and features relating thereto, are described in detail below and/or will be apparent to one skilled in the art based on the description of the invention. Also, while certain aspects of the invention are set forth in the independent and dependent claims that follow the description of the invention, one skilled in the art will understand that individual features of these claims may be combined in a number of different ways and that the invention is not limited to any particular combination of features.

BRIEF DESCRIPTION OF THE DRAWINGS

Various embodiments of the present invention are described in detail below with reference to the attached drawing figures, wherein:

FIG. 17A illustrates an example scan pattern of the MEMS mirror of FIG. 1.

DETAILED DESCRIPTION

The present invention is directed to a LiDAR system that provides performance characteristics and other advantages that are not achievable with conventional ToF and FMCW LiDAR systems. All or a portion of the components of the LiDAR system may be packaged as a solid state LiDAR sensor that can be used in automotive and other applications. While the invention will be described in detail below with reference to various embodiments, it should be understood that the invention is not limited to the specific configuration or methodology of these embodiments. In addition, although the embodiments are described as embodying several different inventive features, one skilled in the art will appreciate that any one of these features could be implemented without the others in accordance with the invention.

A. LIDAR SYSTEM

In general terms, the LiDAR system of the present invention includes a light source for generating light and a scanning assembly that transmits the generated light across a scanning region. The scanning assembly also receives light that has reflected off one or more objects located within the scanning region. An electronic data analysis assembly is provided that generates a plurality of data points each of which comprises distance data associated with a portion of the reflected light. The distance data indicates the distance of the object that provided the portion of the reflected light relative to the system. In certain embodiments, each of the data points also comprises velocity data that indicates the velocity of the object that provided the portion of the reflected light relative to the system. While the LiDAR system of the present invention is preferably provided as a coherent LiDAR system, such as an FMCW LiDAR system, certain aspects of the invention may be incorporated into a ToF LiDAR system as described herein.

Figure 1:
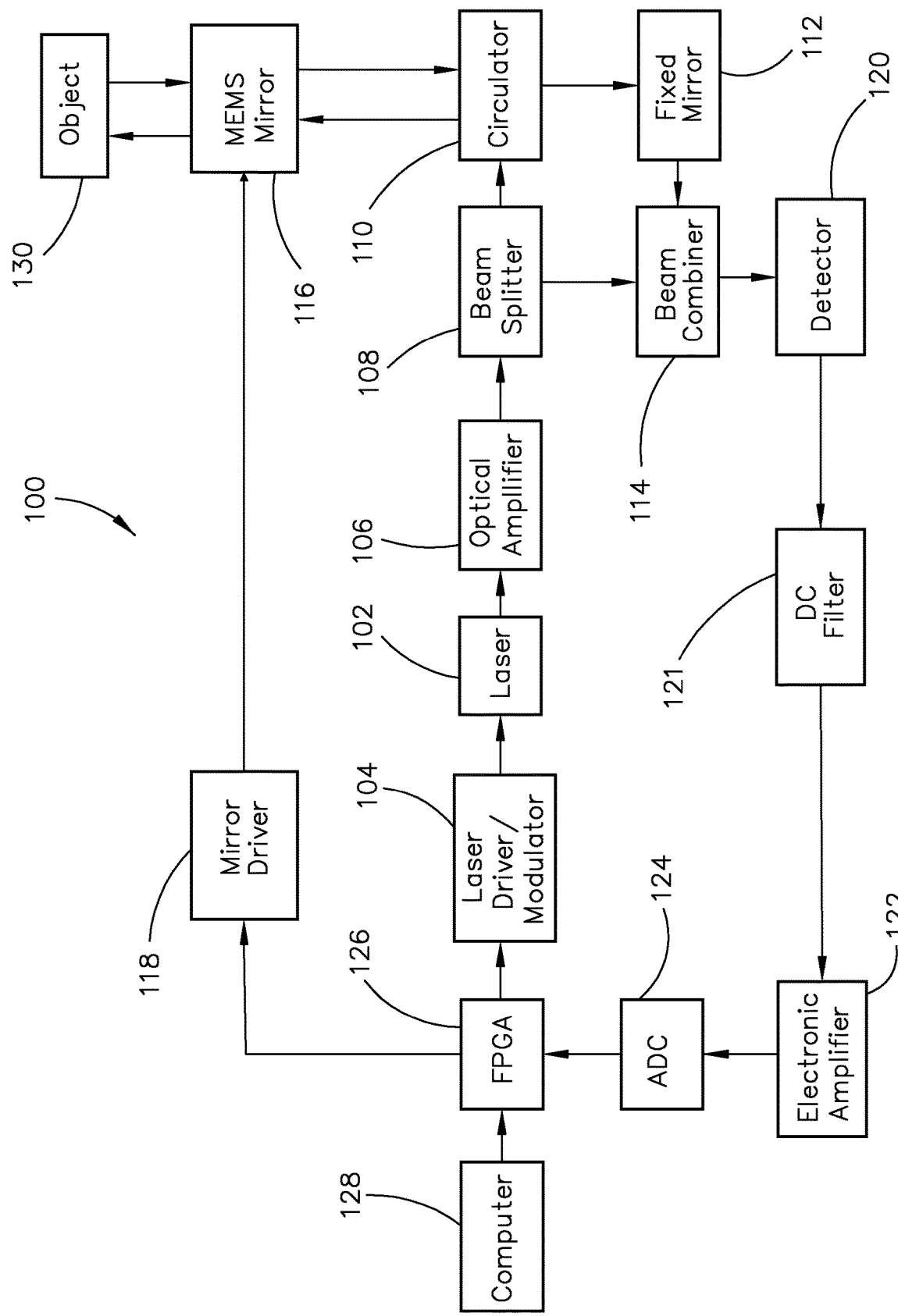
FIG. 1 is a block diagram of an embodiment of a LiDAR system in accordance with the present invention.

Referring to FIG. 1, a block diagram of an embodiment of a LiDAR system in accordance with the present invention is shown generally as reference numeral 100. LiDAR system 100 includes a number of different optical and electronic components, including: a laser assembly that, in the illustrated embodiment, comprises a laser 102 and an associated laser driver/modulator 104; an optical amplifier 106; a mixer assembly that, in the illustrated embodiment, comprises a beam splitter 108, a circulator 110, a fixed mirror 112 and a beam combiner 114; a scanning assembly that, in the illustrated embodiment, comprises a microelectromechanical system (MEMS) mirror 116 and an associated mirror driver 118; a photodetector 120; a direct current (DC) filter 121; an electronic amplifier 122; an analog-to-digital converter (ADC) 124; and an electronic data analysis and control assembly that, in the illustrated embodiment, comprises a field programmable gate array (FPGA) 126 and a computer 128. Each of these components will be described below. Of course, it should be understood that the components of LiDAR system 100 are merely examples and that a variety of different components and system configurations may be used to implement the present invention.

The optical and electronic components of LiDAR system 100 may be manufactured in a variety of different ways, e.g., assembly of individual optical and/or electronic components on a suitable circuit board, use of small-scale electro-optical circuit board technology or fabrication on a silicon chip using photolithographic techniques or a combination of photolithographic and conventional optical manufacturing techniques, including flip chip techniques. All or a portion of the components may be packaged as a solid state LiDAR sensor (i.e., an integrated sensor with no moving parts) that can be used in automotive and other applications, as discussed below. In certain embodiments, all of the components are provided on a single operational surface (e.g., circuit board or silicon chip) to form an integrated LiDAR system. In other embodiments, the components are distributed among two or more operational surfaces. These operational surfaces may be located in close proximity to each other or may be located in different locations to form a distributed LiDAR system. Communication between optical components can be provided using an optical fiber or other type of optical waveguide, and communication between electronic components can be provided using a wire, lead, or other type of electrical connection. Of course, other types of manufacturing methods are possible and within the scope of the present invention.

1. Generation of Optical Chirps

The LiDAR system of the present invention includes a coherent light source having a narrow linewidth for generating a frequency modulated (FM) optical signal that comprises a series of optical "chirps." In the embodiment shown in FIG. 1, the coherent light source comprises a laser assembly in which a laser 102 is driven and controlled by a laser driver/modulator 104. Preferably, laser 102 has a narrow linewidth of 100 kHz or less, more preferably 50 kHz or less, and most preferably 10 kHz or less, i.e., 10 kHz, 9 kHz, 8 kHz, 7 kHz, 6 kHz, 5 kHz, 4 kHz, 3 kHz, 2 kHz, 1 kHz or less (or any value therebetween). The linewidth of laser 102 influences the performance of LiDAR system 100 in different ways. For example, a narrower linewidth provides a higher signal to noise ratio (SNR), as discussed below, and a higher SNR increases the distance (i.e., maximum range) at which objects can be detected for a fixed optical power. In contrast, a laser light source with a wider linewidth provides a lower SNR, and can only perform at shorter distances. As such, the performance of LiDAR system 100 is optimized when using a laser having a linewidth as narrow as possible. Most preferably, laser 102 has an ultra-narrow linewidth of 1 kHz or less, i.e., 1 kHz, 500 Hz, 250 Hz, 100 Hz, 50 Hz, 10 Hz, 5 Hz, 1 Hz or less (or any value therebetween). In addition, as discussed below, the linearity of the chirp affects the performance of LiDAR system 100. It should be noted that the use of a narrower linewidth enables the chirp to be generated at a lower degree of linearity to achieve the same SNR.

One skilled in the art will understand that the linewidth of a laser has an inverse relationship to the length of the laser's optical cavity, i.e., the longer the length of the laser's optical cavity, the narrower the linewidth. A laser, independent of its linewidth, can also be combined with an external optical cavity to extend the optical cavity length and further narrow the linewidth. Examples include a laser stabilized to an external Fabrey-Perot cavity, or other types of optical cavities with a high quality factor and finesse. Locking of the laser to the external optical cavity may be implemented electronically, as in the well-known Pound-Drever-Hall (PDH) scheme, or by direct optical injection locking. Thus, laser 102 may comprise any type of laser, either by itself or in combination with an external optical cavity, which provides the desired linewidth as described above.

In the embodiment illustrated in FIG. 1, laser 102 comprises a source laser, such as a diode laser, in which the linewidth is narrowed via optical injection locking to a whispering gallery mode (WGM) resonator. The WGM resonator supports a whispering gallery mode that serves to entrap and/or accumulate light within the resonator. The whispering gallery mode corresponds to a single frequency produced by the source laser. Such a resonator can have a variety of configurations, such as spherical, toroidal, cylindrical, ring, or similar axis-symmetric configurations, and can be constructed from various optically transparent materials such as glass, quartz, calcium fluoride, fused silica, lithium niobate, silicon, silicon nitride, and other materials that are transparent to the selected optical wavelength. Light from the source laser is coupled into the WGM resonator by any suitable optical coupling device, such as a prism or waveguide. Light from a counter propagating whispering gallery mode wave is coupled out of the WGM resonator (by the same or different optical coupling device) to provide optical injection locking of the source laser, substantially reducing its linewidth. In this embodiment, the linewidth of the source laser locked to the WGM resonator may be as low as 100 Hz or may even be less than 1 Hz. As described below, the WGM resonator is constructed from a material with one or more optical properties, such as refractive index, which can be altered via the application of an electric potential, stress or strain, heat or a combination thereof, thereby altering the frequency supported by the whispering gallery mode. This alters the frequency of the counter propagating whispering gallery mode wave that is directed back to the source laser via optical injection locking to alter the output frequency of the source laser.

Figure 2:
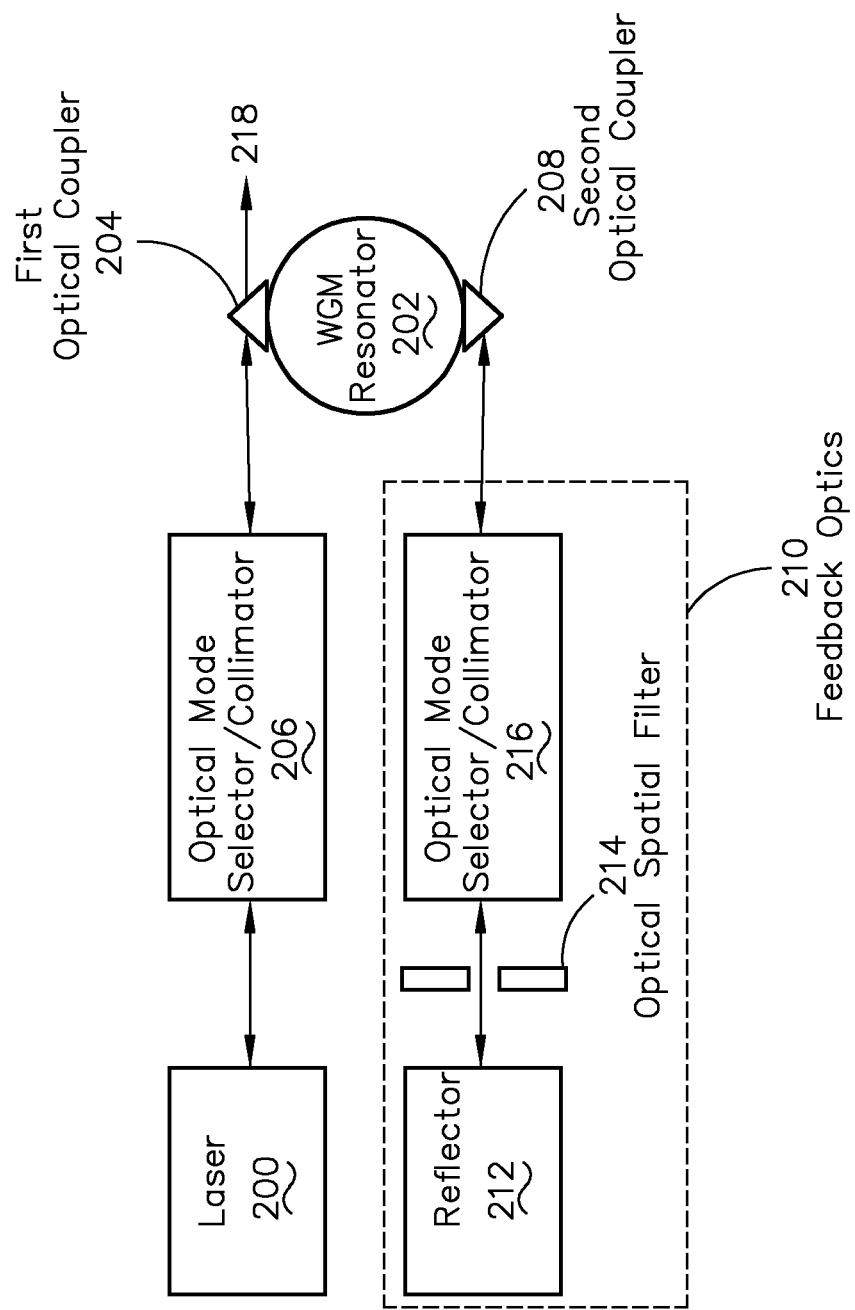
FIG. 2 is a block diagram of an embodiment of a laser that may be used in the LiDAR system of FIG. 1.

A variety of configurations for laser 102 are possible and within the scope of the invention. One embodiment is shown in FIG. 2. In this embodiment, a source laser 200 provides a light beam that is transferred to a WGM resonator 202 by a first optical coupler 204, such as a prism. A collimator or optical mode selector 206 may optionally be interposed between source laser 200 and WGM resonator 202. The light beam from source laser 200 is coupled into WGM resonator 202 wherein a frequency represented in the light beam propagates as a whispering gallery mode wave that is entrapped within WGM resonator 202. A portion of the entrapped light is coupled out of WGM resonator 202 by a second optical coupler 208 and propagates to a set of feedback optics 210. In this embodiment, feedback optics 210 includes a reflector 212 and an optical spatial filter 214 (e.g., a pinhole) positioned between second optical coupler 208 and reflector 212 in order to improve the spatial distribution of the light beam. A collimator or optical mode selector 216 may optionally be interposed between second optical coupler 208 and optical spatial filter 214. Light returned from reflector 212 is coupled back into WGM resonator 202 to provide a counter propagating wave. At least a portion of this counter propagating wave is transferred out of WGM resonator 202 by the first optical coupler 204 and propagates back toward source laser 200. This returning light provides optical injection that locks source laser 200 to the frequency corresponding to the whispering gallery mode of WGM resonator 202, thereby providing a laser output 218 with a narrowed linewidth compared to that of source laser 200 without such optical injection locking. It should be understood that one or more optical properties of WGM resonator 202 may be altered via the application of an electric potential, stress or strain, heat or a combination thereof (as controlled by laser driver/modulator 104), thereby altering the frequency supported by the whispering gallery mode. This alters the frequency of the counter propagating whispering gallery mode wave that is directed back to source laser 200 to alter the output frequency of source laser 200 via optical injection.

Figure 3:
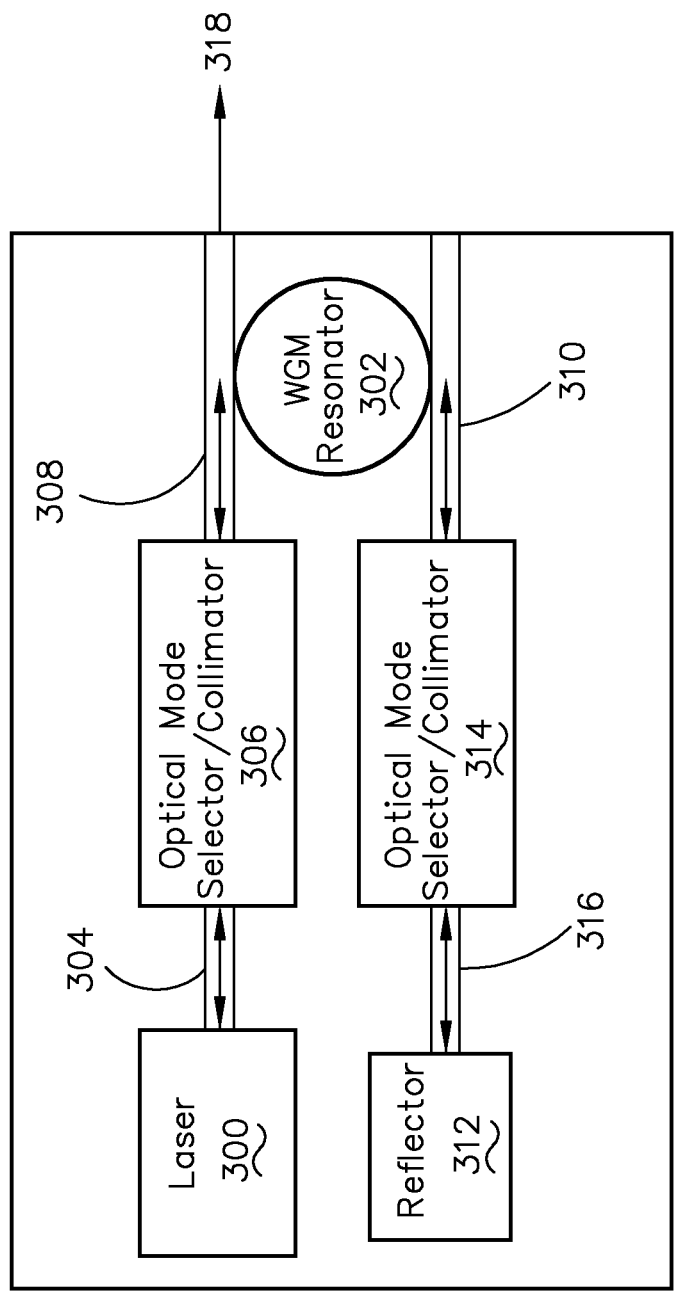
FIG. 3 is a block diagram of another embodiment of a laser that may be used in the LiDAR system of FIG. 1.

Another embodiment is shown in FIG. 3 in which the various components are connected by waveguides such as optical fibers, channels or other guiding structures comprising optically conductive materials. In this embodiment, a source laser 300 is coupled to a WGM resonator 302 via a waveguide 304. A collimator or optical mode selector 306 may optionally be interposed between source laser 300 and WGM resonator 302, with optical communication provided by an additional waveguide 308. Light from source laser 300 is coupled into WGM resonator 302 wherein light corresponding to the whispering gallery mode is entrapped. At least a portion of the entrapped light is coupled out of WGM resonator 302 to a waveguide 310 and propagates toward a reflector 312. A collimator or optical mode selector 314 may optionally be interposed between WGM resonator 302 and reflector 312, with optical communication provided by an additional waveguide 316. Light returned from reflector 312 is coupled back into WGM resonator 302 to provide a counter propagating wave. At least a portion of this counter propagating wave is transferred out of WGM resonator 302 and propagates back toward source laser 300. This returning light provides optical injection that locks source laser 300 to the frequency corresponding to the whispering gallery mode of WGM resonator 302, thereby providing a laser output 318 with a narrowed linewidth compared to that of source laser 300 without such optical injection locking. It should be understood that one or more optical properties of WGM resonator 302 may be altered via the application of an electric potential, stress or strain, heat or a combination thereof (as controlled by laser driver/modulator 104), thereby altering the frequency supported by the whispering gallery mode. This alters the frequency of the counter propagating whispering gallery mode wave that is directed back to source laser 300 to alter the output frequency of source laser 300 via optical injection.

Figure 4:
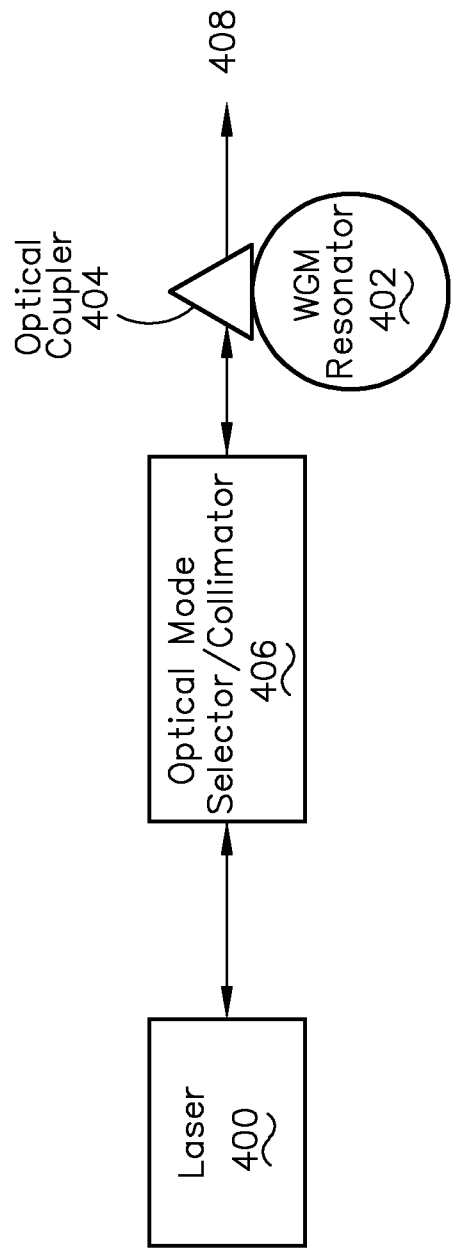
FIG. 4 is a block diagram of yet another embodiment of a laser that may be used in the LiDAR system of FIG. 1.

While the embodiments shown in FIGS. 2 and 3 utilize a reflector to provide a counter propagating wave within the WGM resonator, the embodiment shown in FIG. 4 does not require the use of a reflector and requires only a single optical coupler. In this embodiment, a source laser 400 provides a light beam that is transferred to a WGM resonator 402 by an optical coupler 404, such as a prism or waveguide. A collimator or optical mode selector 406 may optionally be interposed between source laser 400 and WGM resonator 402. The light beam from source laser 400 is coupled into WGM resonator 402 wherein a frequency represented in the light beam propagates as a whispering gallery mode wave that is entrapped within WGM resonator 202. In one example, light scattering within the material of WGM resonator 402 provides a counter propagating wave of sufficient intensity to be useful in optical injection locking of source laser 400. In another example, features are introduced into and/or on the surface of WGM resonator 402 to provide a counter propagating wave. Suitable features include inclusions within the body of WGM resonator 402, pits, channels, or other features generated on the surface of WGM resonator 402, and/or an optical grating generated on the surface of WGM resonator 402. At least a portion of this counter propagating wave is transferred out of WGM resonator 402 by optical coupler 404 and propagates back toward source laser 400. This returning light provides optical injection that locks source laser 400 to the frequency corresponding to the whispering gallery mode of WGM resonator 402, thereby providing a laser output 408 with a narrowed linewidth compared to that of source laser 400 without such optical injection locking. It should be understood that one or more optical properties of WGM resonator 402 may be altered via the application of an electric potential, stress or strain, heat or a combination thereof (as controlled by a control circuit in laser driver/modulator 104), thereby altering the frequency supported by the whispering gallery mode. This alters the frequency of the counter propagating whispering gallery mode wave that is directed back to source laser 400 to alter the output frequency of source laser 400 via optical injection.

Of course, one skilled in the art will understand that laser 102 may comprise other types of source lasers and/or optical resonators that are capable of narrowing the linewidth of a source laser, i.e., the present invention is not limited to the use of a diode laser in which the linewidth is narrowed via optical injection locking to a WGM resonator. For example, it is possible to use a source laser with other types of optical resonators, such as a Fabrey-Perot resonator, resonators formed with Bragg grating mirrors, fiber resonators, and ring resonators. However, these optical resonators have a lower quality factor than a WGM resonator and, thus, will provide a wider linewidth. It is also possible to use other types of source lasers, such as fiber lasers, lasers based on solid state crystals (e.g., a YAG laser), gas lasers, or chemical lasers. These source lasers typically have a linewidth greater than 1 kHz and can optionally be combined with an external Fabrey-Perot resonator or similar type cavity to reduce their linewidth. These lasers, however, are bulky structures and typically weigh in excess of several kilograms and require a large amount of power to operate. In contrast, the diode laser and WGM resonator described above are light, compact and economical and, thus, are more suitable for use in LiDAR system 100 of FIG. 1.

Referring back to FIG. 1, laser driver/modulator 104 is provided to drive and control laser 102 in such a manner as to generate an FM optical signal comprising a series of optical chirps as the laser output. In this embodiment, the WGM resonator of laser 102 is frequency modulatable, i.e., the frequency supported by the whispering gallery mode of the WGM resonator can be altered, which alters the frequency of the laser output. The WGM resonator is constructed from a material (e.g., Lithium Tantalate, Lithium Niobate, Aluminum Nitride, fused silica, calcium fluoride, etc.) with one or more optical properties, such as refractive index, which can be altered via the application of an electric potential, stress or strain, heat or a combination thereof, thereby altering the frequency supported by the whispering gallery mode. A frequency chirp produced in this fashion is highly linear, i.e., the linearity of the chirp is 80% or more and may be as high as 99% or more, as described below. Alternatively, the laser (and not the resonator) of laser 102 may be modulated to alter the frequency of the laser output, such as by changing the current or temperature of the laser. However, this approach will cause stress to the laser and can lead to nonlinearities of the frequency chirp that will require predistortion or feedback correction to ensure linearization of the frequency chirp. As such, modulation of the resonator is preferred in certain implementations.

In one embodiment, laser driver/modulator 104 applies an electric potential to electrodes coupled to the WGM resonator to thereby alter the refractive index of the WGM resonator (in this case, the WGM material is constructed from an electro-optic material such as lithium niobate, lithium tantalite, or aluminum nitride). In another embodiment, laser driver/modulator 104 controls a piezoelectric element coupled to the WGM resonator in order to alter the refractive index of the WGM resonator upon the application of stress or strain. In yet another embodiment, laser driver/modulator 104 controls a resistive heater that alters the refractive index of the WGM resonator upon the application of heat.

Figure 5:
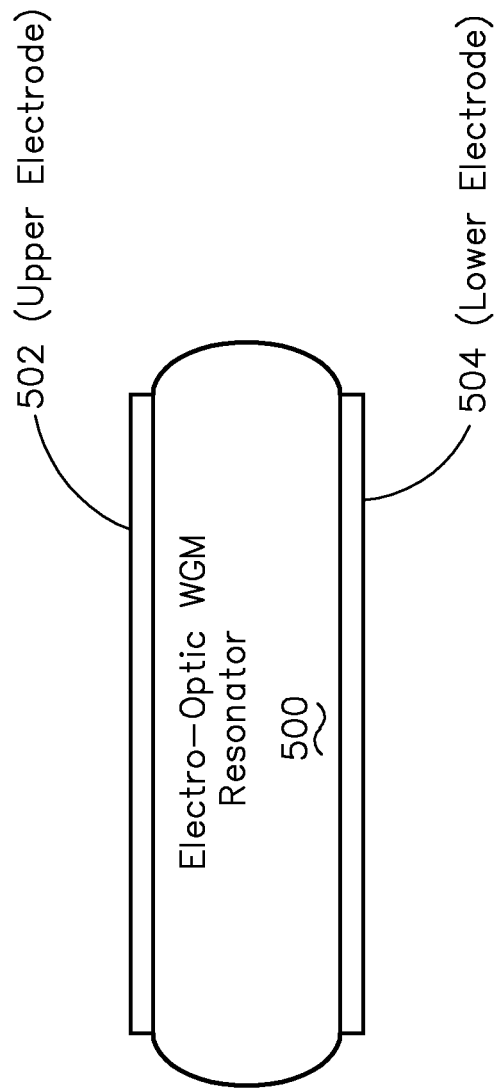
FIG. 5 illustrates an embodiment of a modulatable resonator in which electrodes are placed on opposing planar faces of a discoidal WGM resonator to enable frequency modulation of the laser output, which may be used in the laser of FIG. 1.

An embodiment of a frequency modulatable WGM resonator is shown in FIG. 5. In this embodiment, a WGM resonator 500 has a discoidal shape and is in contact with an upper electrode 502 and a lower electrode 504 applied to opposing planar faces of WGM resonator 500. Laser driver/modulator 104 (not shown in FIG. 5) applies an electric potential to electrodes 502, 504 to alter the refractive index of WGM resonator 500. This alters the frequency supported by the whispering gallery mode of WGM resonator 500, which in turn causes the source laser to follow the resonator mode frequency and be locked to WGM resonator 500 at a different frequency. Modulation of the refractive index of WGM resonator 500 alters the frequency of the laser output over time to thereby enable the generation of optical chirps.

It should be noted that electrical tuning (such as in the embodiment just described) is preferred to piezoelectric tuning or thermal tuning in certain implementations. For example, the embodiment shown in FIG. 5 enables the generation of optical chirps with a chirp bandwidth in the GHz range and at a chirp rate in excess of $1 \times 10^{14}$ Hz/s, as described below. In contrast, piezoelectric tuning provides a narrower chirp bandwidth (e.g., 10-100 MHz) albeit at a comparable chirp rate. Thermal tuning provides a comparable chirp bandwidth but at a lower chirp rate (e.g., $1 \times 10^{11}$ Hz/s).

As described below, laser driver/modulator 104 receives chirp parameters (e.g., chirp configuration, chirp period and chirp bandwidth) from FPGA 126 and uses such chirp parameters to alter an optical property (e.g., refractive index) of the WGM resonator over time such that laser 102 generates an FM optical signal comprising a series of optical chirps. One skilled in the art will appreciate that such an arrangement permits generation of a wide variety of chirp patterns, which can be suitable for different implementations. Various examples of chirp patterns that may be generated by laser 102 are shown in FIGS. 6-9.

Figure 6:
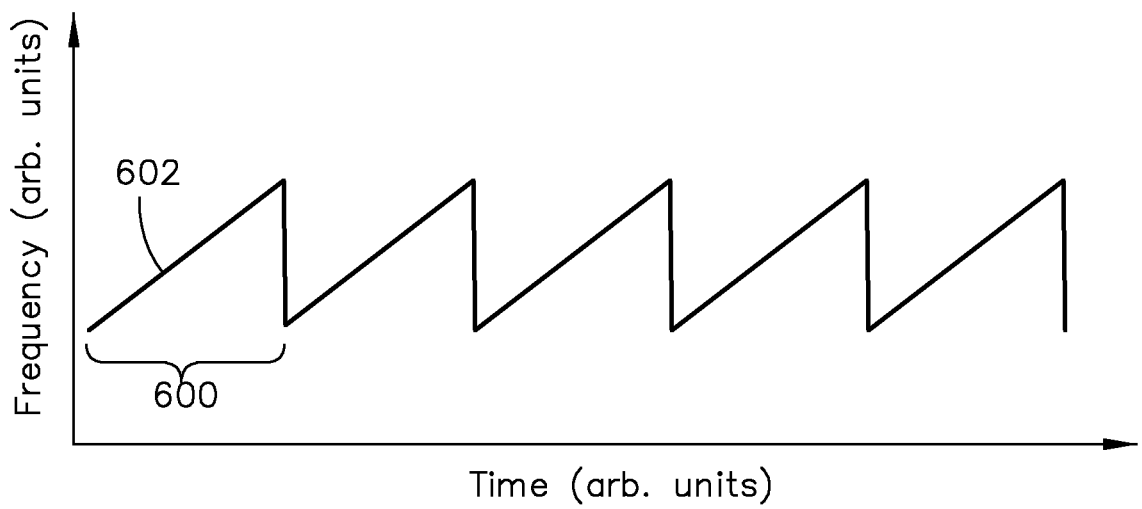
FIG. 6 illustrates an optical signal in the form of an FMCW sawtooth waveform that may be generated by the laser of FIG. 1.

In one embodiment, laser 102 generates an optical signal in which the frequency of the signal is continuously modulated to provide the FMCW sawtooth waveform shown in FIG. 6. This optical signal includes a continuous series of optical chirps, such as optical chirp 600. As can be seen, optical chirp 600 includes an up-chirp portion 602 in which the frequency of the signal increases linearly with time. As described below, the use of this chirp pattern enables direct measurement of the distance of reflective objects.

Figure 7:
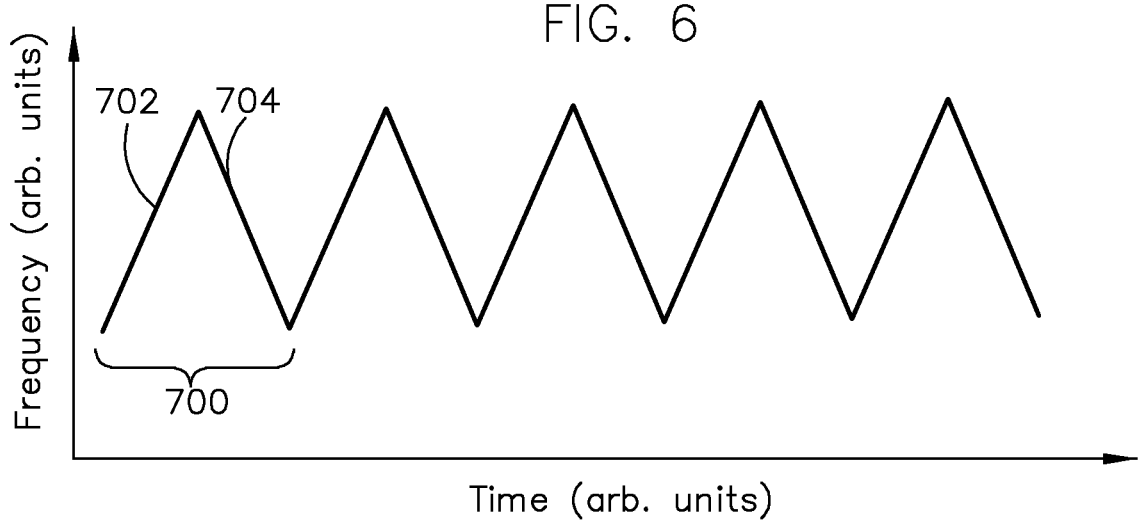
FIG. 7 illustrates an optical signal in the form of an FMCW triangular waveform that may be generated by the laser of FIG. 1.

In another embodiment, laser 102 generates an optical signal in which the frequency of the signal is continuously modulated to provide the FMCW triangular waveform shown in FIG. 7. This optical signal includes a continuous series of optical chirps, such as optical chirp 700. As can be seen, optical chirp 700 includes an up-chirp portion 702 in which the frequency of the signal increases linearly with time and a down-chirp portion 704 in which the frequency of the signal decreases linearly with time. As described below, the use of this chirp pattern enables direct measurement of both the distance and velocity of reflective objects.

Figure 8:
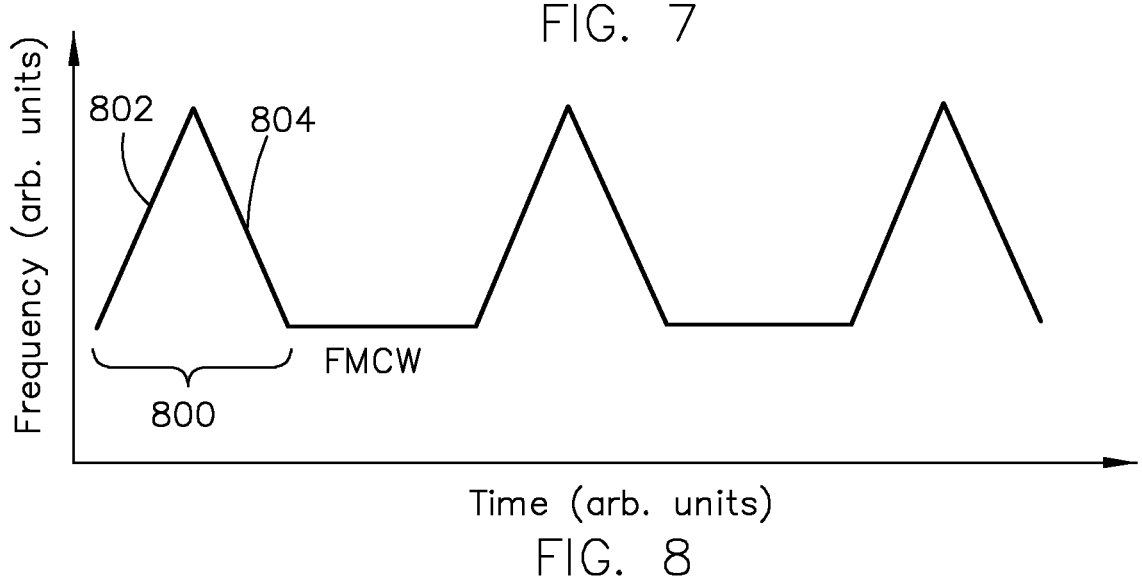
FIG. 8 illustrates an optical signal in the form of an FM pulsed triangular waveform that may be generated by the laser of FIG. 1.

In yet another embodiment, laser 102 generates an optical signal in which the frequency of the signal is modulated to provide the FM pulsed triangular waveform shown in FIG. 8. This optical signal includes a pulsed series of optical chirps, such as optical chirp 800, and is similar to the optical signal shown in FIG. 7 insofar as each of optical chirps includes an up-chirp portion 802 and a down-chirp portion 804 to enable direct measurement of both the distance and velocity of reflective objects. However, the frequency of the optical signal is not continuously modulated. This pulsed chirp pattern may be used in certain coherent LiDAR systems that are limited by downstream processing or in which the use of a pulsed chirp is otherwise more advantageous.

Figure 9:
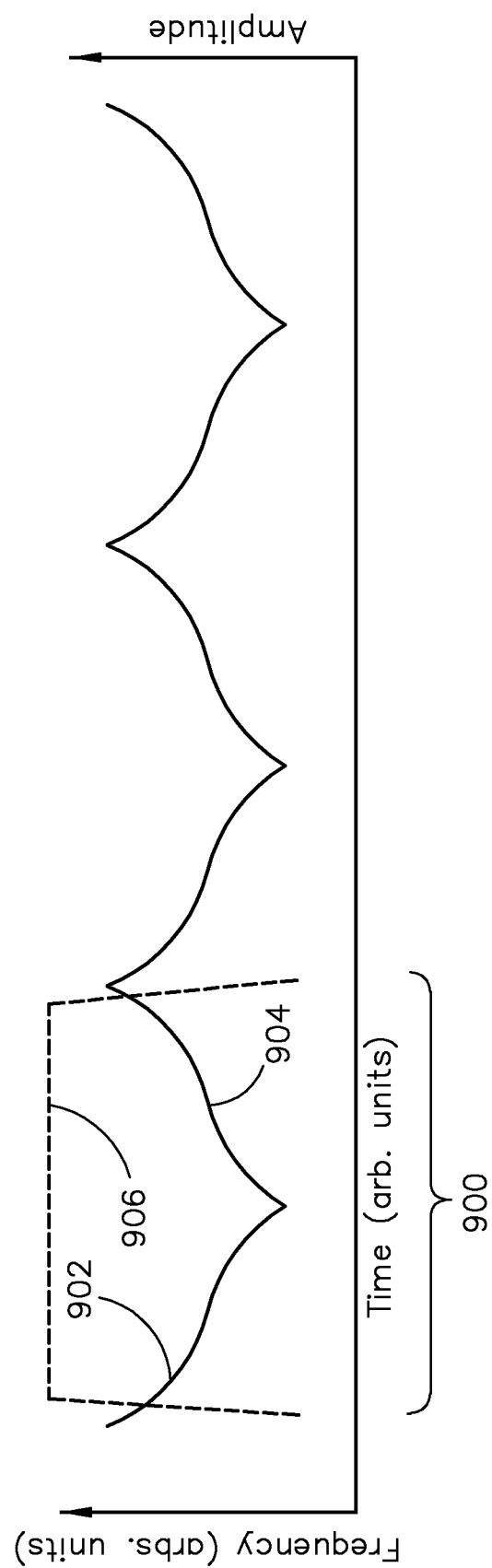
FIG. 9 illustrates an optical signal in the form of an FMCW sigmoid-shaped waveform that may be generated by the laser of FIG. 1.

In a further embodiment, laser 102 generates an optical signal in which the frequency of the signal is continuously modulated to provide the FMCW sigmoid-shaped waveform shown in FIG. 9. This optical signal includes a continuous series of optical chirps, such as optical chirp 900. As can be seen, optical chirp 900 includes a down-chirp portion 902 in which the frequency of the signal decreases nonlinearly with time in a sigmoidal fashion and an up-chirp portion 904 in which the frequency of the signal increases nonlinearly with time in a sigmoidal fashion. Each of the optical chirps can also change in amplitude 906 (shown in dashed lines) during the duration of the chirp. For example, the amplitude may increase rapidly during the initial portion of the chirp and decrease rapidly over the final portion of the chirp. Other types of nonlinear optical chirps may also be used, such as quadratic, cubic, staircase, or any other shape in which the frequency is modulated in such a way that it is monotonic over half of the modulation period (i.e., chirps in which the frequency never decreases on any up-chirp portion and never increases on any down-chirp portion). Nonlinear chirps may be used in covert operations, or in certain systems that require reduction of interference and/or reduction of false object detection beyond that provided by the linear chirp patterns discussed above. It is also possible to use hybrid chirp patterns in which each optical chirp is linear through a first portion of the chirp and nonlinear (e.g., sigmoidal) through a second portion of the chirp. It should be appreciated that optical chirp patterns that include any element of nonlinearity will increase the processing time required to analyze the reflected optical chirps by FPGA 126 and, thus, may not be suitable for certain implementations.

Preferably, laser 102 generates an FM optical signal in which the variation between optical chirps is minimized or in which there is a controlled variation between optical chirps. Optical chirps can be characterized by a number of quantifiable factors, including chirp linearity, chirp bandwidth, chirp period and chirp rate (each of which will be described below). Variation within a population of optical chirps can be expressed as a standard deviation and/or coefficient of variation (CV) surrounding a central value for such quantifiable factors. In certain embodiments, the CV for each of these factors for a statistically significant group of optical chirps (e.g., greater than 32) is less than 25%, i.e., 25%, 20%, 15%, 10%, 7.5%, 5%, 2.5%, 1%, 0.5%, 0.25%, 0.1% or less (or any value therebetween). Each of these factors will now be described.

With reference to the chirp patterns shown in FIGS. 6-9, it can be seen that each optical chirp has an instantaneous frequency that changes linearly with time (FIGS. 6-8) or that changes nonlinearly with time in such a manner that the nonlinear function is defined (FIG. 9). The linearity of a generated optical chirp may be expressed as a correlation between the measured frequency and the ideal frequency at various points in time. A generated optical chirp that is perfectly linear (or perfectly nonlinear) will have a linearity of 100% at each time point (e.g., the optical chirps shown in FIGS. 6-9), while deviations from ideal behavior will result in a linearity of less than 100%.

Preferably, each optical chirp generated by laser 102 is substantially linear such that the linearity is greater than 80% at each point in time, i.e., 80%, 82%, 84%, 86%, 88%, 90%, 92%, 94%, 96%, 98%, or 100% (or any value therebetween). It should be understood that chirp linearity increases the SNR of the received optical chirps, which can be calculated from the following equation:

$$SNR = \frac{I_{signal}^2}{2eI_{signal}B_{Rx} + \frac{4k_B T B_{Rx}}{Z} + I_{RIN} + \frac{V_{quant}}{Z} + I_{dark}} \quad (1)$$

where:
SNR=signal to noise ratio
$I_{signal}$=signal intensity (see equation (2) below)

e=charge of electron
$B_{Rx}$=receiver bandwidth
$k_B$=Boltzmann's constant
T=temperature
Z=load resistance
$I_{RIN}$=laser relative intensity noise current
$V_{quant}$=quantization voltage noise
$I_{dark}$=photodetector dark current With reference to equation (1), the signal intensity ($I_{signal}$) can be calculated from the following equation:

$$I_{signal} = 2\Re \cdot \sqrt{P_{LO} P_{Tx}} \cdot \left(\frac{r_{Rx}}{R}\right)^2 \cdot e^{-2R\alpha} \cdot \rho \cdot \eta_{signal} \quad (2)$$

where:
$I_{signal}$=signal intensity
$\Re$=photodetector responsivity
$P_{LO}$=local oscillator power
$P_{Tx}$=transmitted (output beam) power
$r_{Rx}$=radius of receiver area
R=range to target object
e=charge of electron
$\alpha$=absorption depth of air
$\rho$=reflectivity of target object
$\eta_{signal}$=efficiency of signal (see equation (3) below)

With reference to equation (2), the efficiency of the signal ($\eta_{signal}$) can be calculated from the following equation:

$$\eta_{signal} = \eta_{target} \cdot \eta_{pol} \cdot \eta_{speckle} \cdot \eta_{lin} \cdot \eta_{optics} \cdot \eta_{align} \cdot \eta_{beam} \cdot \eta_{Doppler} \quad (3)$$

where:
$\eta_{signal}$=efficiency of signal
$\eta_{target}$=efficiency of beam hitting target object (1 if entire beam falls on object)
$\eta_{pol}$=efficiency of depolarization from scattering (1 if polarization does not change)
$\eta_{speckle}$=efficiency of speckle/target object roughness (1 if object perfectly flat)
$\eta_{lin}$=efficiency of chirp linearity (1 if chirp is perfectly linear)
$\eta_{optics}$=efficiency of optics (1 if all optics in system have transmission=1)
$\eta_{align}$=efficiency of interferometer alignment (1 if LO and return beams perfectly aligned)
$\eta_{beam}$=efficiency of interferometer shape matching (1 if LO and return beam profiles are exact same shape)
$\eta_{Doppler}$=efficiency of Doppler broadening of laser (1 if the moving components which beam is incident on (e.g., mirror) have constant velocity across laser profile)

Thus, increasing the efficiency of chirp linearity ($\eta_{lin}$) in equation (3) results in a higher signal intensity ($I_{signal}$) in equation (2), which in turn results in a higher SNR in equation (1). As such, the SNR is optimized when each optical chirp is highly linear. Of course, the other variables in equations (1)-(3) should also be chosen to optimize the SNR as required for a particular implementation. In a preferred embodiment, each optical chirp generated by laser 102 has a linearity greater than 95% at each point in time, i.e., 95%, 96%, 97%, 98%, 99%, or 100% (or any value therebetween). Preferably, the resultant SNR is 10 dB or higher, although LiDAR system 100 can detect optical signals with a SNR as low as 2 or 3 dB at a maximum range of 200 meters. In this embodiment, the SNR is in the range of 3 dB to 110 dB or a subrange within this broader range, e.g., 10 dB to 110 dB or 10 dB to 80 dB. It can be appreciated that a larger SNR is preferred in order to extend the maximum range of LiDAR system 100 without increasing the power of the laser.

In the embodiment in which laser 102 comprises a source laser optically coupled to a modulatable WGM resonator, the laser configuration naturally exhibits high linearity in excess of 80% without the need for predistortion or feedback correction to ensure linearization of the frequency chirp. This is the case even at a high output rate (i.e., pixel rate) of 50,000 points/second or more, as described below. As such, laser 102 can be operated at a high output rate with reduced complexity. In contrast, many conventional FMCW LiDAR systems will lose the linearity of the chirps at an output rate of 50,000 points/second or more unless predistortion or feedback correction is used to ensure linearization of the frequency chirp, such as through a measured and recorded correction factor or through an active feedback system (e.g., with a Mach-Zehnder interferometer).

With reference again to the chirp patterns shown in FIGS. 6-9, it can be seen that each optical chirp has a chirp bandwidth defined by the range of frequencies within each optical chirp. Preferably, each optical chirp generated by laser 102 has a chirp bandwidth in the range of 1 GHz to 100 GHz, i.e., 1 GHz, 5 GHz, 10 GHz, 15 GHz, 20 GHz, 25 GHz, 30 GHz, 35 GHz, 40 GHz, 45 GHz, 50 GHz, 60 GHz, 70 GHz, 80 GHz, 90 GHz, 100 GHz (or any value therebetween). It is also possible that the chirp bandwidth could be greater than 100 GHz and up to 1 THz, i.e., 100 GHz, 200 GHz, 300 GHz. 400 GHz, 500 GHz, 600 GHz, 700 GHz, 800 GHz, 900 GHz, 1 THz (or any value therebetween). It should be understood that the range resolution of LiDAR system 100 is a function of the chirp bandwidth, as shown by the following equation:

$$\Delta R = \frac{c}{2B} \times \frac{T}{t} \quad (4)$$

where:
$\Delta R$=range resolution in meters
c=speed of light (approximately $3.00 \times 10^8$ meters/second)
B=chirp bandwidth in Hz
T=chirp period in seconds
t=integration time in seconds Thus, it can be seen that a greater chirp bandwidth results in a smaller range resolution. Preferably, LiDAR system 100 provides a range resolution of 20 cm or less, i.e., 20 cm, 15 cm, 12.5 cm, 10 cm, 7.5 cm. 5 cm, 2.5 cm, 1 cm, 5 mm, 1 mm or less (or any value therebetween). In addition, it should be understood that the range resolution can be improved by oversampling in the data processing or by using an FM pulsed waveform.

Referring again to the chirp patterns shown in FIGS. 6-9, it can be seen that each optical chirp has a chirp period that comprises the time duration of each optical chirp. Preferably, each optical chirp generated by laser 102 has a chirp period in the range of 50 kHz to 500 kHz or a subrange within this broader range, e.g., 50 kHz to 375 kHz or 325 kHz to 375 kHz. It should be appreciated that the chirp repetition rate (i.e., the rate at which the optical chirps are transmitted and received by a scanner, such as MEMS mirror 116) is a function of the chirp period. For example, in a continuous wave, the chirp repetition rate will be equal to the chirp period. Preferably, the output rate (i.e., pixel rate) is matched to the chirp repetition rate, wherein the output rate is the number of data points processed per second (as described in greater detail below with reference to the operation of FPGA 126 and computer 128). Thus, the chirp period determines the chirp repetition rate and the output rate of LiDAR system 100.

Referring yet again to the chirp patterns shown in FIGS. 6-9, it can be seen that each optical chirp has a chirp rate comprising the rate at which the frequency changes within the chirp (e.g., the slope of the chirp). For example, in the FMCW sawtooth waveform shown in FIG. 6, the chirp rate is equal to the chirp bandwidth (B) divided by the chirp period (T), i.e., B/T. As another example, in the FMCW triangular waveform shown in FIG. 7, the chirp rate is equal to 2B/T. Preferably, each optical chirp generated by laser 102 has a chirp rate in the range of $1 \times 10^{14}$ Hz/s to $5 \times 10^{16}$ Hz/s. Of course, it should be understood that the chirp rate is determined by the chirp bandwidth and chirp period that are chosen for a particular implementation.

In summary, the laser assembly of LiDAR system 100 includes a narrow linewidth laser 102 that, when driven and controlled by laser drive/modulator 104, generates an FM optical signal comprising a series of optical chirps. Preferably, each of the optical chirps is substantially linear with a wide chirp bandwidth, a short chirp period and a high chirp rate so as to optimize the performance of LiDAR system 100, although a plurality of other waveforms are also possible with the scope of the invention. The FM optical signal generated by laser 102 may optionally be amplified by optical amplifier 106 to increase the power level of the signal. Of course, if the power level of the laser output is sufficiently large for a particular implementation, then optical amplifier 106 is not required. An example of a suitable optical amplifier is a semiconductor optical amplifier (SOA).

2. Transmission of Optical Chirps and Detection of Reflected Optical Chirps

Referring back to FIG. 1, the FM optical signal generated by laser 102 (which may optionally be amplified by optical amplifier 106) propagates to beam splitter 108, which divides the optical signal into two separate signals—one of which propagates to circulator 110 and the other of which propagates to beam combiner 114. It should be understood that these optical signals are identical and include a series of optical chirps, such as any of the chirp patterns shown in FIGS. 6-9, or other types of waveforms.

Circulator 110 directs the FM optical signal received from beam splitter 108 to a scanning assembly. In the illustrated embodiment, the scanning assembly comprises a dual-axis MEMS mirror 116 that is driven and controlled by mirror driver 118 in such a manner as to scan a region of space in accordance with a designated scan pattern. As described in detail below, mirror driver 118 receives scan parameters (e.g., field of view, spatial resolution and offset) from FPGA 126 and uses such scan parameters to set the mirror position and timing for each point in the scan pattern.

MEMS mirror 116 enables the LiDAR system 100 to operate as a monostatic device in which both the transmission and reception functions are provided in a single device. Specifically, MEMS mirror 116 controls the transmission of the optical chirps across the scanning region and the reception of the incoming, reflected optical chirps. If the FM optical signal is continuous, laser 102 is always in a state of being chirped and MEMS mirror 116 continuously transmits the optical chirps and receives the reflected optical chirps at a desired chirp repetition rate (which is a function of the chirp period (T), as discussed above). As such, any object (such as object 130 shown in FIG. 1) located within the scanning region may be illuminated for a partial chirp period, a single chirp period, or multiple chirp periods, depending on the implementation. The position from which the transmitted FM optical chirps leave MEMS mirror 116 and the position from which the reflected optical chirps are received by MEMS mirror 116 are coaxial and proximal to provide a compact device.

Figure 10:
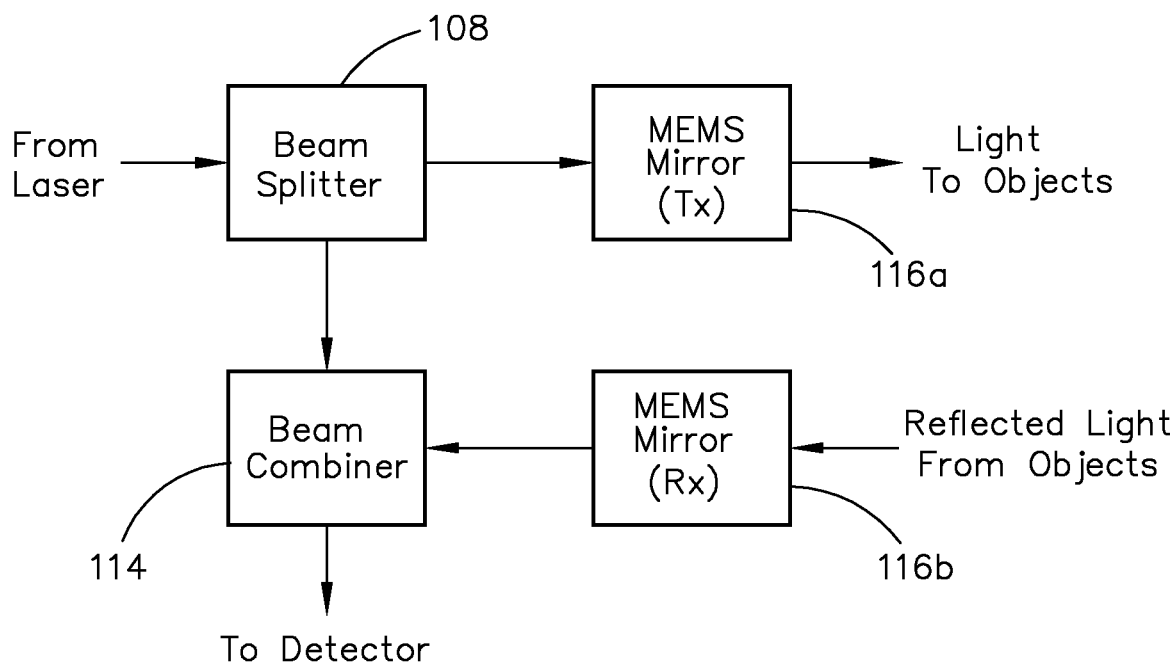
FIG. 10 is a block diagram of an alternative embodiment of a mixer assembly that may be used in the LiDAR system of FIG. 1.

It should be understood that a variety of devices are suitable for providing the scanning function, i.e., the present invention is not limited to the use of a single scanner such as MEMS mirror 116. In certain embodiments, the transmission and reception functions are provided by two separate devices. For example, as shown in FIG. 10, it is possible to use one MEMS mirror 116a to provide the transmission function and another MEMS mirror 116b to provide the reception function. In this case, the circulator 110 of FIG. 1 would not be required. Note that beam splitter 108 and beam combiner 114 are the same as those in FIG. 1, and fixed mirror 112 (not shown in FIG. 10) may be required in certain implementations to direct light from MEMS mirror 116b to beam combiner 114. Additional components would be needed to monitor and maintain control over the alignment of the two MEMS mirrors 116a, 116b, as is known in the art. For this reason, the use of a single MEMS mirror is preferred in certain implementations.

Figure 11:
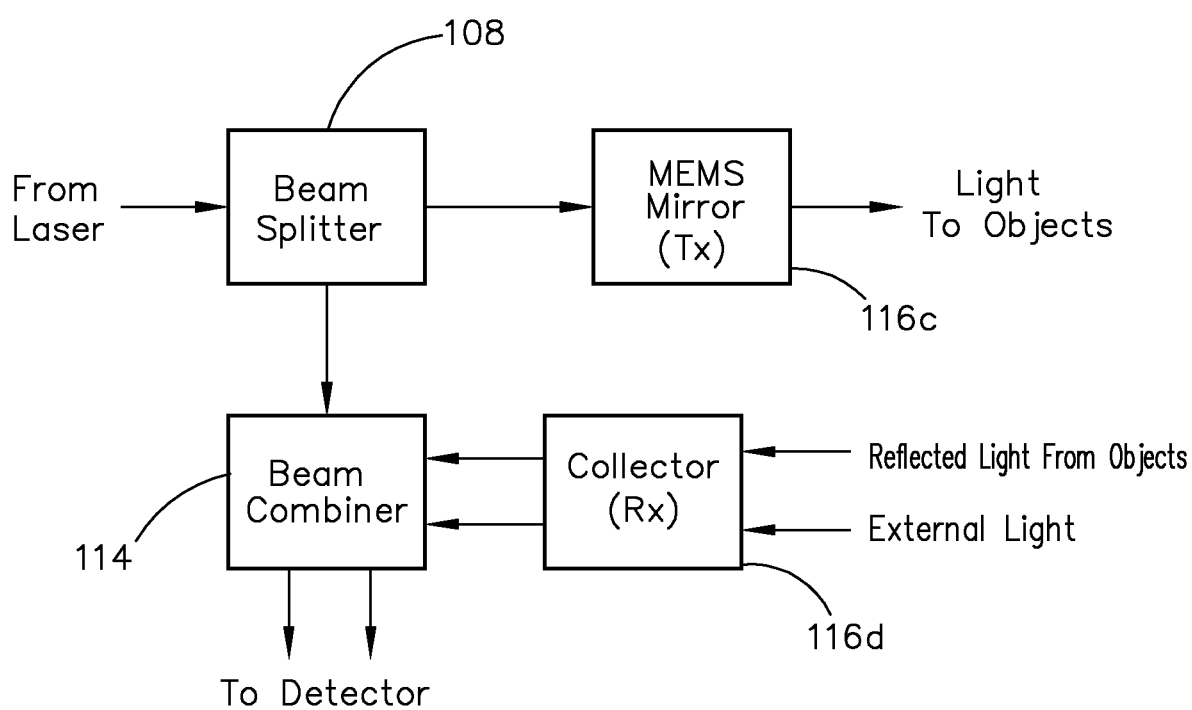
FIG. 11 is a block diagram of another alternative embodiment of a mixer assembly that may be used in the LiDAR system of FIG. 1.

As another example, as shown in FIG. 11, it is possible to use a MEMS mirror 116c to provide the transmission function and a collector 116d to provide the reception function. In this case, the circulator 110 of FIG. 1 would not be required. Note that beam splitter 108 and beam combiner 114 are the same as those in FIG. 11, and fixed mirror 112 (not shown in FIG. 11) may be required in certain implementations to direct light from collector 116d to beam combiner 114. Because collector 116d sees the entire field of view, off-angle external light could enter and be detected by the system causing interference. This interference would mostly be attributable to multiple reflections from a reflective object (i.e., clutter) and would be filtered out by FPGA 126, as discussed below. In comparison, many conventional ToF LiDAR systems use non-angle selective receivers that see interference from other light sources outside of the direction of interest, such as light from the sun or light from other LiDAR systems. Thus, it should be understood that the type of interference associated with ToF systems is different from interference caused by clutter.

Other devices for providing the transmission and/or reception functions include a phased array steering device, rotating or gimbal-mounted mirrors, mirrors mounted on actuators (e.g., electric motors, solenoids, and or piezoelectric devices) in a mutually orthogonal fashion, rotating prisms, and/or rotating lenses. Of course, one skilled in the art will appreciate that other scanning devices are also possible and within the scope of the present invention.

In one embodiment, the optical chirps are transmitted across the scanning region at an optical power in the range of 10 mW to 3 W or a subrange within this broader range, e.g., 10 mW to 400 mW, 10 mW to 200 mW, 30 mW to 100 mW, or 40 mW to 60 mW. In a preferred embodiment, the transmitted optical power is 50 mW.

Figure 12:
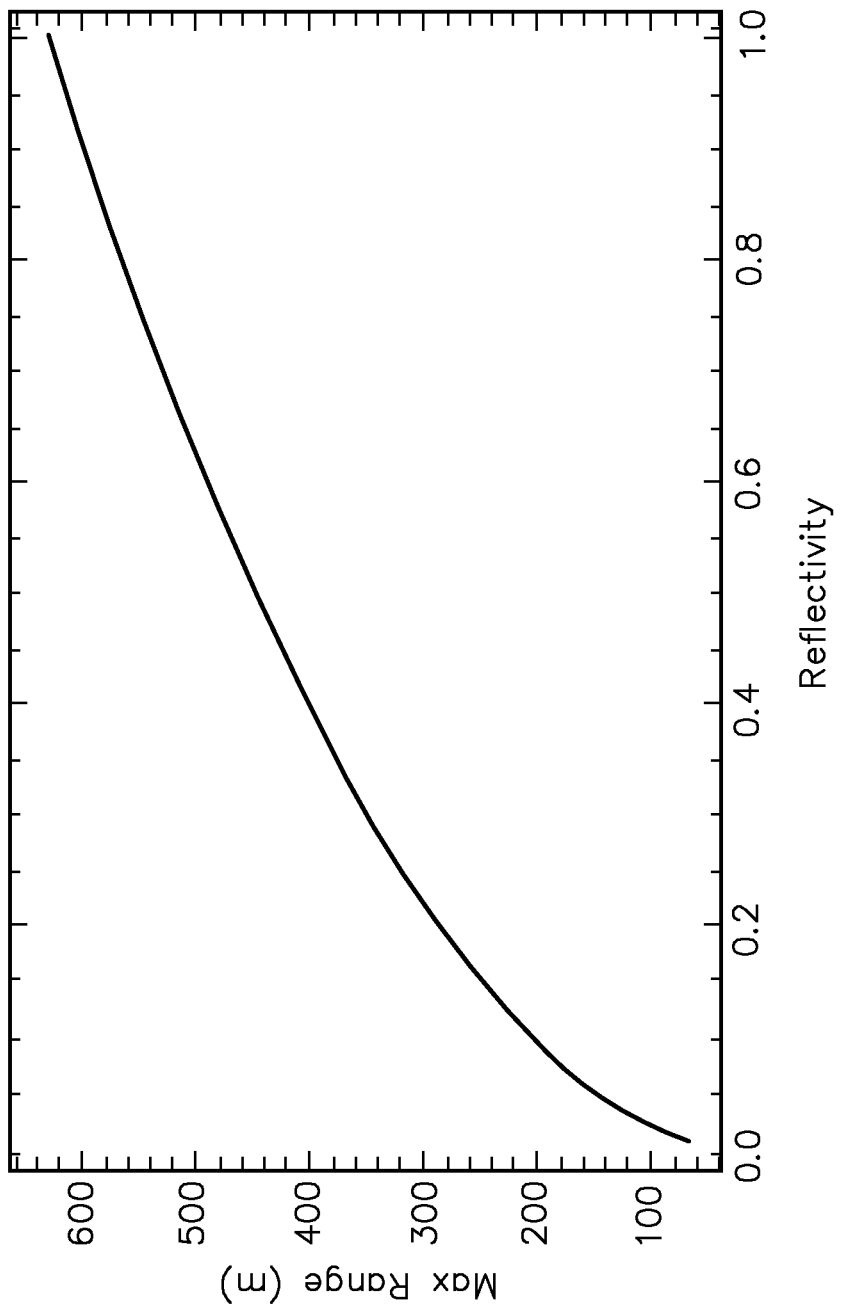
FIG. 12 is a graph that shows maximum range as a function of the reflectivity of an object.

As mentioned above, any object located within the scanning region may be illuminated for a partial chirp period, a single chirp period, or multiple chirp periods, depending on the implementation. There is a limit on the greatest distance that an object can be detected, which is referred to as "maximum range." The maximum range is a function of the reflectivity of the object and the SNR of the reflected optical chirps, as shown by the following equation:

$$SNR \propto \frac{\rho}{R^2} \qquad (5)$$

where:
SNR=signal to noise ratio of reflected optical chirps
$\rho$=reflectivity of target object
R=range to target object Thus, it can be appreciated from equation (5) that the maximum range is proportional to the square root of the reflectivity of the object at an equivalent SNR, as follows:

$$R_{max} \propto \sqrt{\rho} \text{ (at equivalent SNR)} \qquad (6)$$

where:
$R_{max}$=maximum range to target object
$\rho$=reflectivity of target object In accordance with these principles, the graph of FIG. 12 shows an example of the maximum range as a function of the reflectivity of an object. For purposes of this example, it is assumed that the transmitted optical power is 50 mW and the minimum detectable SNR is 3 dB. In this case, it can be seen that a 10% reflective object can be detected at distances up to at least 200 meters, a 20% reflective object can be detected at distances up to about 283 meters, a 30% reflective object can be detected at distances up to about 346 meters, a 40% reflective object can be detected at distances up to about 400 meters, a 50% reflective object can be detected at distances up to about 447 meters, a 60% reflective object can be detected at distances up to about 490 meters, a 70% reflective object can be detected at distances up to about 529 meters, an 80% reflective object can be detected at distances up to about 566 meters, a 90% reflective object can be detected at distances up to about 600 meters, and a 100% reflective object can be detected at distances up to about 632 meters. Of course, it can be appreciated that the maximum range for any object is dependent on the transmitted optical power. For example, the maximum range can be increased up to 1 kilometer for a 100% reflective object if the transmitted optical power is increased above 50 mW. It can be appreciated that the maximum range in relation to the transmitted optical power for a particular object reflectivity may be derived from equations (1)-(3) above.

There is also a limit on the shortest distance that an object can be detected, which is referred to as "minimum range." In one embodiment, the minimum range is between 1 millimeter and 1 meter, and is dependent on the range resolution.

Further, there is a limit to the relative velocity of a reflective object in order to enable detection of the reflected optical chirp, which is referred to as "maximum velocity." In one embodiment, the maximum velocity is in the range of 200 mph (89.4 m/s) to 450 mph (201.2 m/s), and is dependent on the transmitted optical power (i.e., increasing the power increases the SNR and thus indirectly allows velocity determination to occur) and chirp bandwidth (i.e., increasing the bandwidth increases the maximum velocity that can be measured). In addition, the velocity resolution is between 0.2 mph (0.09 m/s) and 2 mph (0.9 m/s), and is dependent on the integration time (i.e., decreasing the integration time increases the velocity resolution that can be measured).

In one embodiment, the source laser has a wavelength in the range of 1400 nm to 4000 nm or a subrange within this broader range, e.g., 1400 nm to 1800 nm, 1500 nm to 1800 nm, or 1530 nm to 1560 nm (i.e., the optical communications C-band). The accuracy of the laser wavelength is preferably in the range of 0.01 nm to 30 nm or a subrange within this broader range, e.g., 0.01 nm to 0.1 nm, 0.1 nm to 30 nm, or 0.1 nm to 10 nm. It can be appreciated that these wavelengths enable penetration through sub-optimal environmental conditions, such as clouds, dust, smoke, snow, and rain. Of course, it is also possible to use source lasers having other wavelengths, such as 895 nm, 1064 nm, 2 micrometers and any other wavelengths. Because LiDAR system 100 has lower noise sensitivity than conventional LiDAR systems at wavelengths in excess of about 850 nm, the required transmitted optical power for detection at an equivalent distance is lower. As such, LiDAR system 100 provides better eye safety than conventional LiDAR systems. Of course, it should be understood that the permissible transmitted optical power at these wavelengths to insure eye safety is a function of the field of view and frame rate and preferably satisfies the following equation:

$$\frac{P \times f}{w} \leq 533 \text{ mJ} \qquad (7)$$

where:
P=optical power in W
f=frame rate in Hz
w=solid angle in steridians

Referring back to FIG. 1, each reflected optical chirp received by MEMS mirror 116 propagates to circulator 110, which in turn directs it to fixed mirror 112. Fixed mirror 112 is suitably positioned to intercept each reflected optical chirp and direct it to beam combiner 114. Of course, fixed mirror 112 would not be required in a waveguide-based system. Beam combiner 114 combines each reflected optical chirp with an optical chirp in the light beam received from beam splitter 108. It can be appreciated that each optical chirp in the light beam received from beam splitter 108 can serve as a local oscillation (LO) reference chirp that is used to characterize a reflected optical chirp (discussed below). As such, laser 102 acts as the source of each LO reference chirp to reduce the complexity and size of LiDAR system 100, and a separate local oscillator is not required.

After combination of a reflected optical chirp with an LO reference chirp, the combined optical signal propagates to photodetector 120. In this embodiment, photodetector 120 comprises a PIN photodiode that coherently mixes each reflected optical chirp with a corresponding LO reference chirp at the surface of the photodiode and converts the mixed optical signal to an electrical signal. Because the reflected optical chirp and LO reference chirp are coincident on the surface of the photodiode, the total intensity of the mixed optical signal can be expressed as follows:

$$I = I_{LO} + I_{reflected} + 2\sqrt{(I_{LO}I_{reflected})} \cos[(f_{LO} - f_{reflected})t] \qquad (8)$$

where:
I=intensity of mixed optical signal in W
$I_{LO}$=intensity of LO reference chirp in W
$I_{reflected}$=intensity of reflected optical chirp in W
$f_{LO}$=frequency of LO reference chirp in Hz
$f_{reflected}$=frequency of reflected optical chirp in Hz In equation (8), the first two terms (i.e., $I_{LO} + I_{reflected}$) represent the DC component of the optical intensity and the third term represents the AC component of the optical intensity. Because the reflected optical chirp and corresponding LO reference chirp are coherent with one another, their electric fields combine within the third term (i.e., the third term is the product of the two electric fields). Importantly, any incoherent contributions to the optical intensity originating from external light sources (e.g., the sun, extreme lighting, light caused by intentional interference) only add to the DC component of the optical intensity.

It should be understood that photodetector 120 may comprise other types of optical detectors, such as an avalanche photodiode (APD), a single-photon avalanche diode (SPAD), a photo-multiplier tube (PMT), a nanowire photon detector, or a quantum well photodetector. Of course, the use of a PIN photodiode is preferred due to its lower cost and relatively low noise generation. It should be understood that conventional ToF LiDAR systems typically cannot use a PIN photodiode because of the need for a more sensitive photodetector to detect the relatively faint reflected signal at longer ranges. As such, the ability to use a PIN photodiode in the LiDAR system of the present invention provides cost and functional advantages that are not possible with conventional ToF LiDAR systems. Furthermore, since the signal out of the photodetector has a frequency below a GHz, a low bandwidth photodetector will suffice. In ToF LiDAR systems, the bandwidth of the photodetector is typically multiples of GHz in order to provide adequate performance.

In this embodiment, a DC filter 121 is provided to electrically filter out the DC components of the signal. As such, the electrical signal comprises the AC component of the optical intensity (i.e., the third term of equation (8)) as converted into electrical current, as follows:

$$J = 2R\sqrt{(I_{LO} I_{reflected})} \cos[f_{LO} - f_{reflected})t] \quad (9)$$

where:
J=electrical current output of photodiode in amps
R=photodiode responsivity in amps/W
$I_{LO}$=intensity of LO reference chirp in W
$I_{reflected}$=intensity of reflected optical chirp in W
$f_{LO}$=frequency of LO reference chirp in Hz
$f_{reflected}$=frequency of reflected optical chirp in Hz In other embodiments, two photodiodes may be used to optically filter out the DC components of the optical intensity and other DC-like noise (in which case DC filter 121 is not required). Because the DC components of the optical intensity are filtered out either electronically (by DC filter 121) or optically (by two photodiodes), including those attributable to external light sources, LiDAR system 100 has reduced to no interference from external light sources. In contrast, conventional ToF LiDAR systems are highly susceptible to interference caused by external light sources. This issue becomes more pronounced as the distance between the transmitter and the reflective object increases, as such distance necessarily decreases the strength of the reflected pulses.

The electrical signal generated by photodetector 120 and optionally filtered by DC filter 121 may be amplified by electronic amplifier 122 to increase the power level of the signal. Of course, if the power level of the electrical signal is sufficient for a particular implementation, then electronic amplifier 122 is not required. The electronic signal is then routed to ADC 124, which converts the electrical signal to digital data. It can be appreciated that this digital data is derived from each reflected optical chirp and corresponding LO reference chirp that were coherently mixed at photodetector 120, i.e., a "pixel" of data. This pixel data is then analyzed by FPGA 126, as described below.

3. Data Analysis and Object Detection

In this embodiment, FPGA 126 or any other type of processing device, such as an application specific integrated circuit (ASIC), a central processing unit (CPU), or a graphics processing unit (GPU), processes each pixel of data received from ADC 124 by initially applying a fast Fourier transform algorithm to the time-domain data. Two examples of this process will be described below with reference to the FMCW sawtooth and triangular waveforms shown in FIGS. 6 and 7, respectively.

Figure 13A:
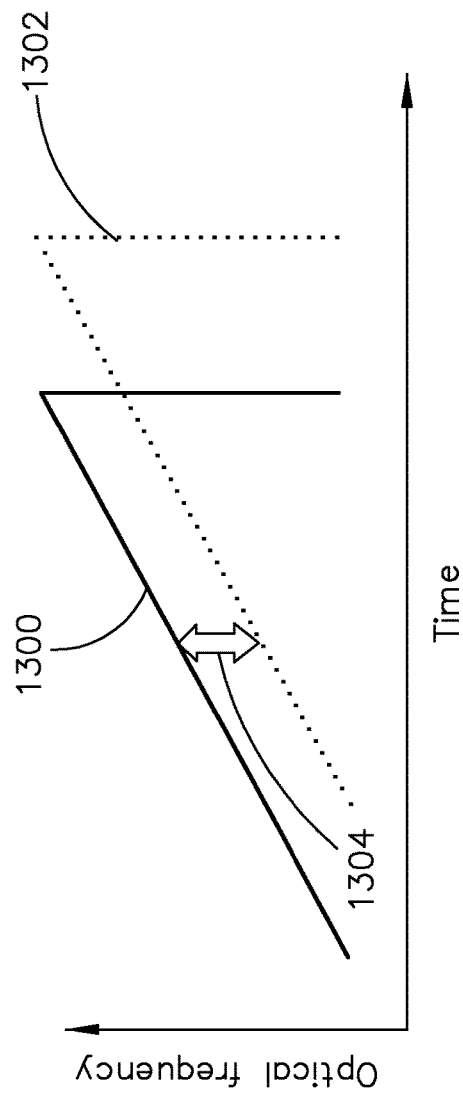
FIG. 13A illustrates a single optical chirp of the optical signal of FIG. 6 (which serves as the local oscillator reference signal) along with the corresponding reflected optical chirp.
Figure 13B:
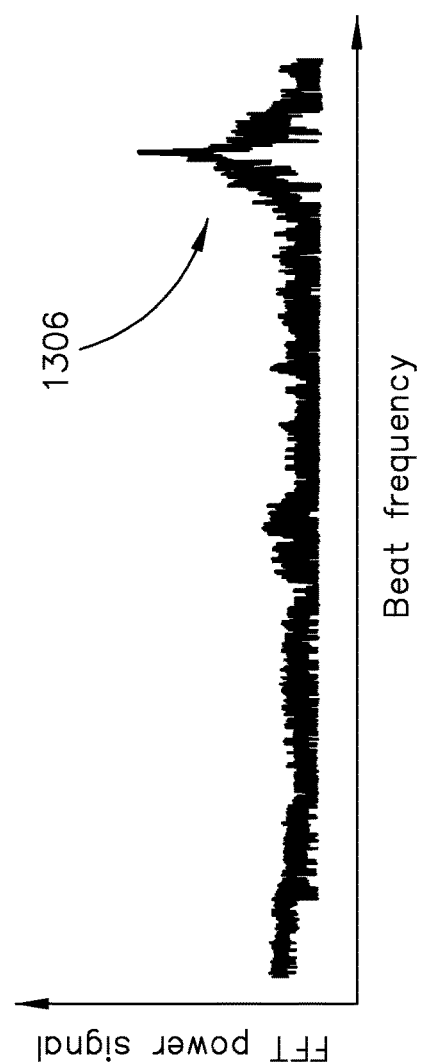
FIG. 13B illustrates the Fourier transformation of the time-domain data.

In one example shown in FIG. 13A, one of the optical chirps of the FMCW sawtooth waveform shown in FIG. 6 is designated as optical chirp 1300. It should be understood that optical chirp 1300 is an LO reference chirp generated by laser 102, which is representative of the transmitted optical chirp. The reflected optical chirp corresponding to LO reference chirp 1300 is designated as optical chirp 1302. Reflected optical chirp 1302 is superimposed on LO reference chirp 1300 in order to illustrate the frequency difference 1304 (i.e., the beat frequency) at a specific point in time. The Fourier transformation is shown in FIG. 13B and provides a power signal peak 1306 that is indicative of the distance between LiDAR system 100 (technically, photodetector 120) and the reflective object that provided reflected optical chirp 1302. In this manner, FPGA 126 is able to calculate the distance for each pixel of data received from ADC 124.

Figure 14A:
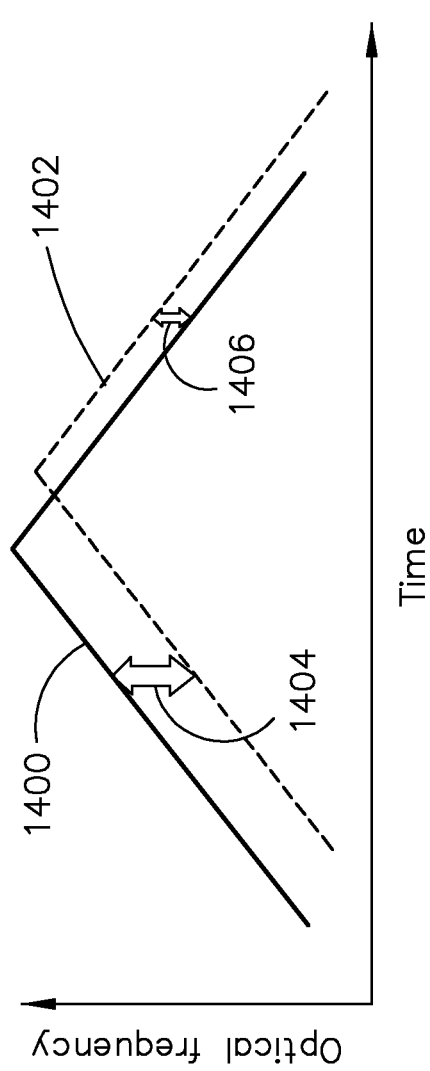
FIG. 14A illustrates a single optical chirp of the optical signal of FIG. 7 (which serves as the local oscillator reference signal) along with the corresponding reflected optical chirp.
Figure 14B:
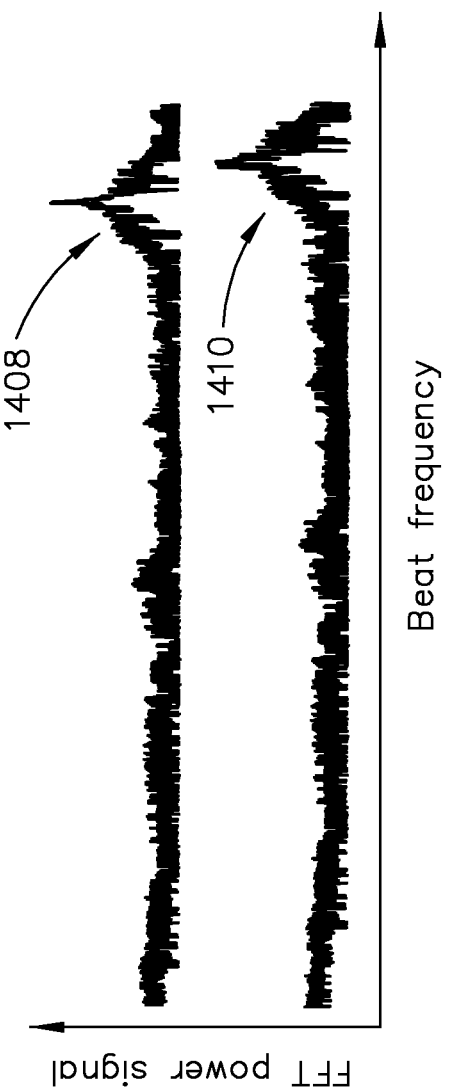
FIG. 14B illustrates the Fourier transformation of the time-domain data.

In another example shown in FIG. 14A, one of the optical chirps of the FMCW triangular waveform shown in FIG. 7 is designated as optical chirp 1400. It should be understood that optical chirp 1400 is an LO reference chirp generated by laser 102, which is representative of the transmitted optical chirp. The reflected optical chirp corresponding to LO reference chirp 1400 is designated as optical chirp 1402. Reflected optical chirp 1402 is superimposed on LO reference chirp 1400 in order to illustrate the frequency difference 1404 in the up-chirp portion (i.e., the up-chirp beat frequency) at a specific point in time and the frequency difference 1406 in the down-chirp portion (i.e., the down-chirp beat frequency) at a specific point in time. The Fourier transformation is shown in FIG. 14B and provides a power signal peak 1408 that is indicative of the distance between LiDAR system 100 (technically, photodetector 120) and the reflective object that provided reflected optical chirp 1402, as well as a power signal peak 1410 that is indicative of the relative velocity between LiDAR system 100 (technically, photodetector 120) and the reflective object that provided reflected optical chirp 1402. In this manner, FPGA 126 is able to calculate both the distance and velocity for each pixel of raw data received from ADC 124.

It can be appreciated that the use of an FMCW triangular waveform is preferred over an FMCW sawtooth waveform insofar as each pixel includes both distance data and velocity data. Of course, distance data and velocity data can also be obtained in a similar manner when using the FM pulsed waveform shown in FIG. 8 or the sigmoid-shaped waveform shown in FIG. 9. The ability to directly determine the velocity of an object based on an analysis of a reflected optical chirp in relation to an LO reference chirp provides an advantage over a conventional ToF system, in which two frames of data are required to calculate velocity because the object must be identified at least twice in order to calculate the shift in position of the object.

After the Fourier transformation, FPGA 126 may optionally compare the transformed data to a calibration file in order to subtract any possible undesired noise spikes. FPGA 126 then further processes the data for derivatization of the distance and/or velocity of the reflective object that provided the reflected optical chirp. Finally, the position (i.e., spatial coordinates) of each reflective object is calculated based on the derived distance of the reflective object and the MEMS mirror position at the time of transmission of the optical chirp. FPGA 126 then provides each pixel of position and/or velocity data to computer 128. It should be noted that if a collector is used as the receiver (see FIG. 11), any clutter would be seen as a separate power signal peak of the Fourier transformation and, in this case, FPGA 126 would compare adjacent pixels or possibly multiple frames to identify and filter the clutter.

Referring back to FIG. 1, FPGA 126 outputs the position and/or velocity data for each pixel to computer 128. Computer 128 may comprise a CPU, a GPU, or any other type of processing device, and may process the position and/or velocity data received from FPGA 126 in a variety of different ways. For example, in one embodiment, computer 128 simply outputs the raw position and/or velocity data received from FPGA 126 to an external control system for object detection and identification and any other processing required for a particular application. The data transfer may be accomplished via Ethernet, Low-Voltage Differential Signaling (LVDS), Universal Serial Bus (USB), Controller Area Network (CAN) bus, or any other communications protocol. The external control system may comprise, for example, a system that creates and/or displays a 3D point cloud, fuses LiDAR data with data from other sensors, identifies objects for avoidance, and the like.

In another embodiment, computer 128 processes the raw position and/or velocity data received from FPGA 126 and outputs processed data to an external control system as described above in the form of a point cloud, i.e., a collection of data points each of which provides point attributes for position and/or velocity. In some embodiments, the point cloud may also provide other types of point attributes, such as the overall intensity of the reflected optical chirp. In addition, the point cloud may provide point attributes that are derived from other attributes, such as information on the color, composition or texture of a reflective object derived from the intensity of the reflected optical chirp (albeit this implementation would require the use of two or more lasers). The external control system may then use this point cloud data for object detection and identification and any other processing required for a particular application.

Figure 15:
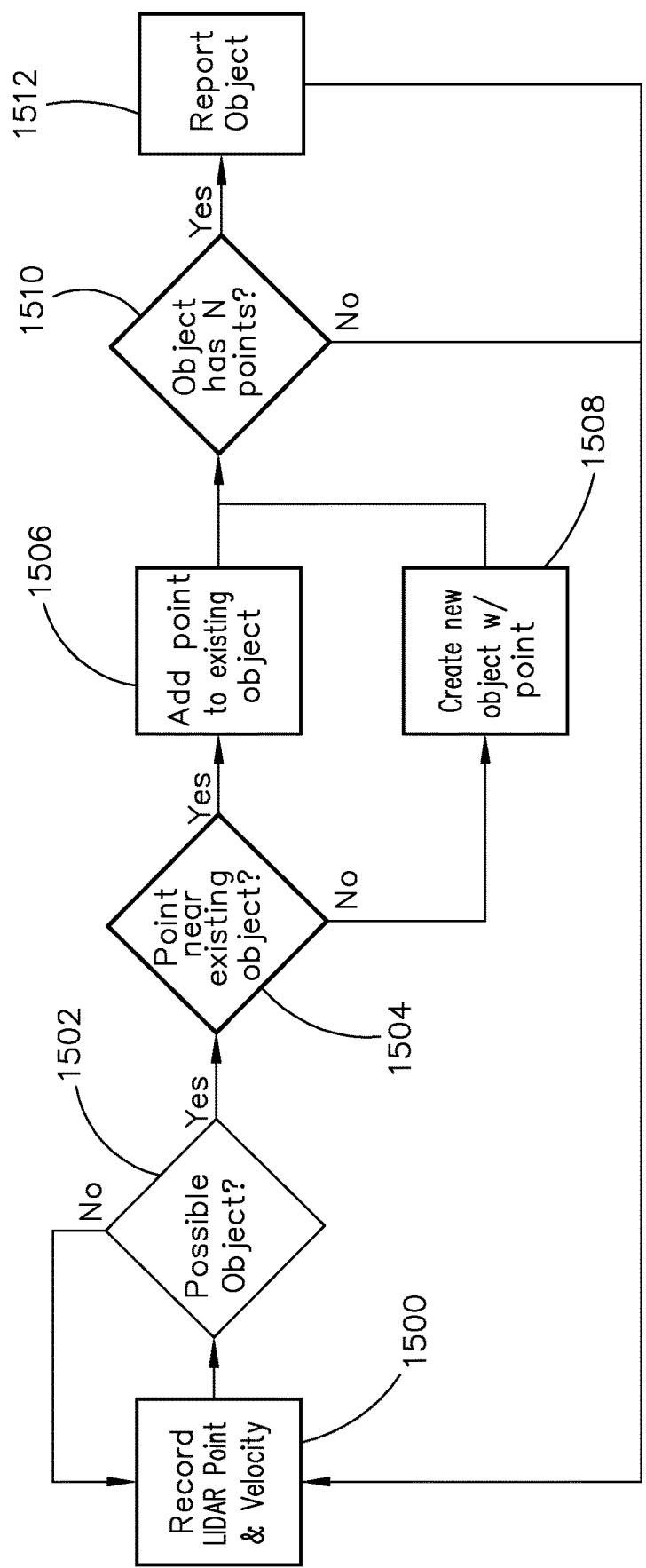
FIG. 15 illustrates an example method for providing object detection.

In yet another embodiment, computer 128 processes the raw position and velocity data received from FPGA 126 to provide the object detection function and then outputs an object list to an external control system as described above for object identification and any other processing required for a particular application. An example method for providing object detection is shown in FIG. 15. In step 1500, computer 128 records the position and velocity associated with a pixel or "point" from the scan. In step 1502, computer 128 determines if the point is a possible object. If NO, the method returns to step 1500. If YES, computer 128 determines at step 1504 if the point is near an existing object, i.e., a previously identified object. If YES, computer 128 adds the point to the existing object at step 1506. If NO, computer 128 creates a new object that includes the point at step 1508. Then, at step 1510, computer 128 determines if the object (either the existing object or a newly created object) has N points. If NO, the method returns to step 1500 and the process is repeated for an additional point. If YES, computer 128 reports the object in step 1512. In this embodiment, the point-to-point latency (i.e., the time required to identify each point) is in the range of 220 s to 100 ms or a subrange within this broader range, e.g., 220 μs to 45 ms, 220 μs to 16 ms, 500 μs to 16 ms, 1 ms to 16 ms, or 220 μs to 1 ms.

Because computer 128 records velocity data for each point from the scan, only N points need to be identified in order to detect an object. N is a designated threshold needed to make a decision on object detection, e.g., N may be one (1), three (3), eight (8) or some other integer based on Johnson's criteria or equivalent. For example, if it takes 3 μs to identify each point and N=8 from Johnson's criteria, and if the processing latency is about 200 s, then the total latency for object detection would be about 224 s. Even if an object's point list is not complete until N lines have been scanned in the direction perpendicular to the fast scan axis (a worst-case scenario), the total latency for object detection would be about 2 ms to 5 ms. Thus, the LiDAR system of the present invention enables low-latency object detection that is not achievable with conventional LiDAR systems. In one embodiment, the object detection latency is in the range of 1 ms to 80 ms or a subrange within this broader range, e.g., 1 ms to 40 ms, 2 ms to 40 ms, 2 ms to 16 ms, or 2 ms to 5 ms.

Figure 16:
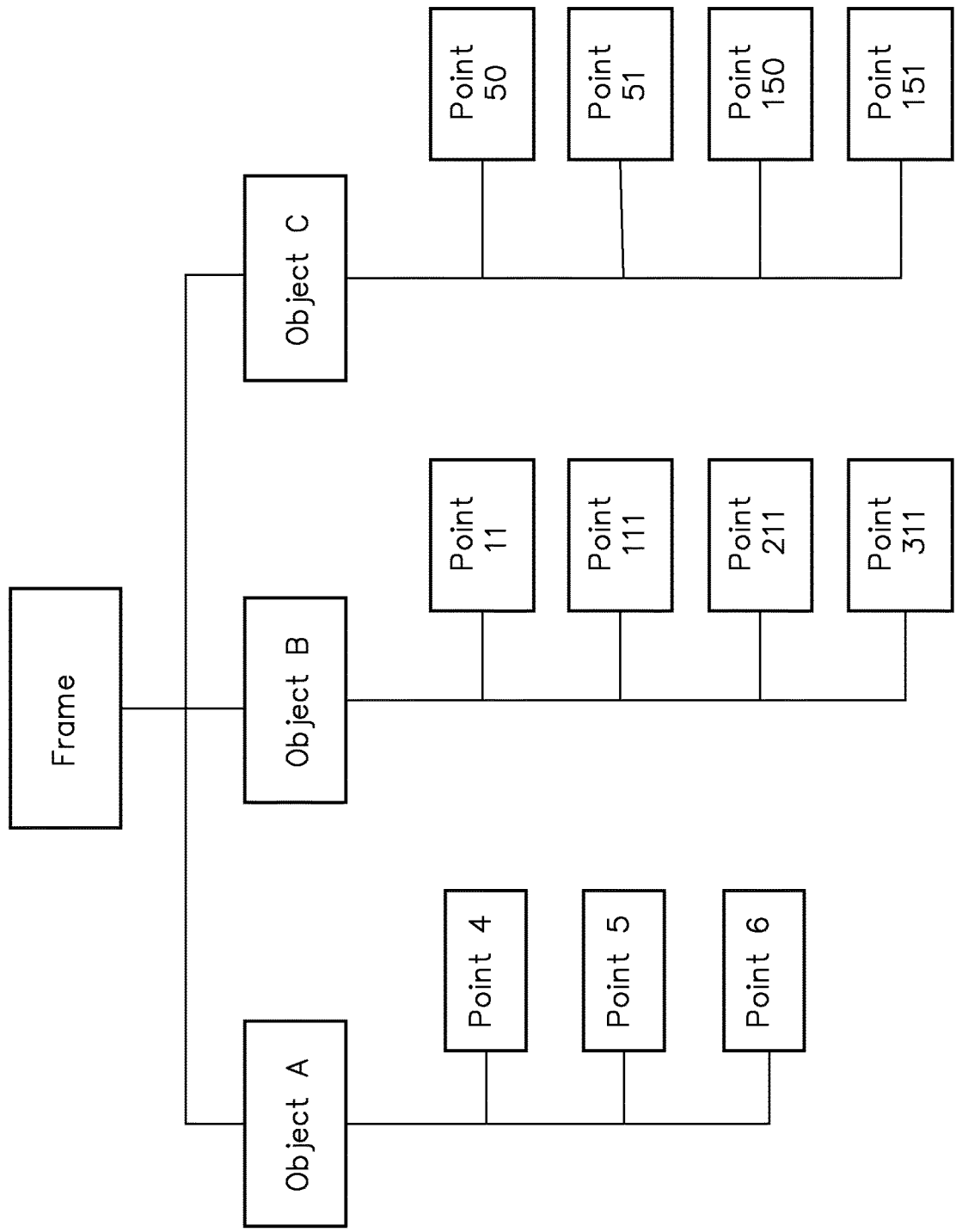
FIG. 16 illustrates an example data structure of detected objects in a frame.
Figure 17B:
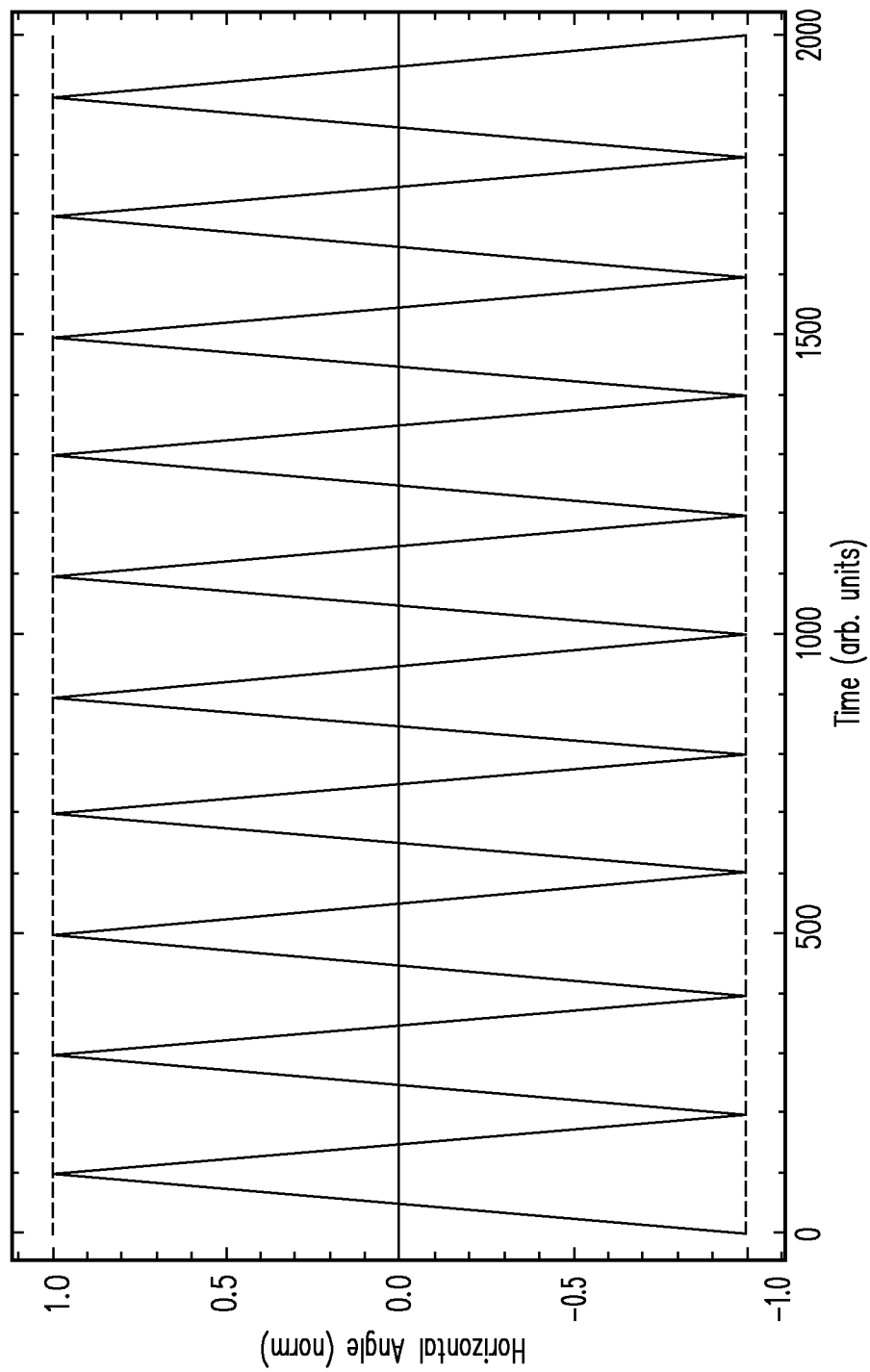
FIG. 17B illustrates the horizontal component of the scan.
Figure 17C:
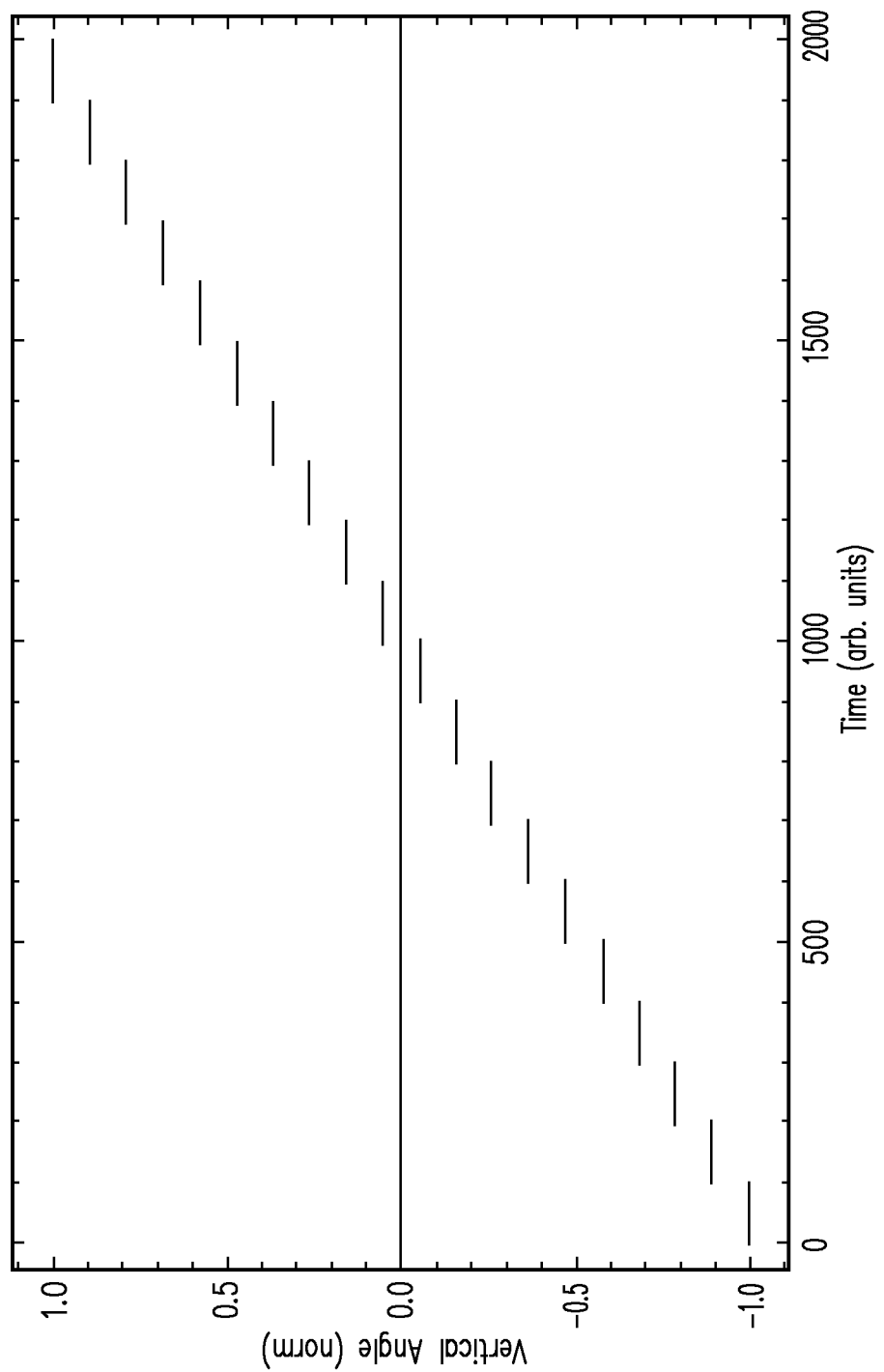
FIG. 17C illustrates the vertical component of the scan.

FIG. 16 shows an example data structure for a single frame of data processed by computer 128, such as the frame shown in FIGS. 17A-17C. In this example, the frame was generated based on a scan of 20 horizontal scan lines with 100 points per scan line (as shown in FIG. 17A), wherein the horizontal angle is scanned at a faster rate than the vertical angle (as shown by comparing FIG. 17B to FIG. 17C). That is, all 100 points of a horizontal line are scanned before incrementing vertically to the next scan line.

As can be seen in FIG. 16, computer 128 identified three objects in the frame using the object detection method of FIG. 15, namely, object A, object B and object C. Three points were associated with object A (points 4, 5 and 6), four points were associated with object B (points 11, 111, 211 and 311), and four points were associated with object C (points 50, 51, 150 and 151). In this embodiment, each point contains position and velocity data. As shown in FIG. 17A, object A is positioned horizontally such that points 4, 5 and 6 were scanned one after another; object B is positioned vertically such that 100 points were processed between consecutive points (e.g., 100 points were processed between point 11 and point 111); and object C is positioned both horizontally and vertically such that points 50 and 51 were scanned one after another and then 100 points were processed before points 151 and 152 were scanned one after another.

It should be noted that, in a conventional ToF LiDAR system, two frames of data are required to calculate velocity because the object must be identified at least twice in order to calculate the shift in position of the object. At 80-200 ms per frame, the latency is at least 160-400 ms, neglecting any additional object detection and velocity calculation overhead. Thus, a conventional ToF LiDAR system provides much longer latency for object detection than the coherent LiDAR system of the present invention. One skilled in the art will also understand that a coherent LiDAR system only needs two frames of data to calculate acceleration, whereas a ToF LiDAR system would need three frames of data to calculate acceleration.

As mentioned above, the output rate (i.e., pixel rate) is matched to the chirp repetition rate, wherein the output rate is the number of data points processed per second by FPGA 126. In one embodiment, FPGA 126 supports an output rate in the range of 50,000-500,000 points/second or a subrange within this broader range, e.g., 50,000-350,000 points/second, 100,000-350,000 points/second, or 300,000-350,000 points/second. In a preferred embodiment, the output rate is 333,000 points/second. Also, the output density is in the range of 55,000-300,000 points/solid angle and, similarly, the detector output density is in the range of 55,000-300,000 points/solid angle/detector. It should be noted that these parameters are dependent on the linearity of the optical chirps, which is in excess of 80% in this embodiment. It can be appreciated that this high chirp linearity enables larger values for the output rate, output density and detector output density, as set forth above.

4. Control of Chirp Generation and Scanning Functions

The LiDAR system of the present invention includes one or more control assemblies for controlling different aspects of the system, such as the chirp generation and scanning functions. In one embodiment, both of those control functions are provided by FPGA 126 and computer 128, as described below. Of course, separate control assemblies for each of these control functions could be used within the scope of the present invention.

In one embodiment, FPGA 126 internally generates the chirp pattern to be used by laser 102 based on various chirp parameters. These chirp parameters include, for example, chirp configuration (e.g., triangular waveform, sawtooth waveform, etc.), chirp period and chirp bandwidth. FPGA 126 may default to known chirp parameters or may receive chirp parameters from computer 128. For example, computer 128 may dynamically change the chirp parameters in software to enable adaptive range resolution as desired for a particular implementation. FPGA 126 provides the chirp parameters to laser driver/modulator 104 to control the chirp generation function.

FPGA 126 can also internally generate the scan pattern (i.e., mirror positions and/or timing) to be used by a scanner, such as MEMS mirror 116, based on various scan parameters. These scan parameters include, for example, the field of view for a frame (i.e., full scan or adaptive scan), spatial resolution (i.e., number of scan lines and pixels per scan line) for a frame, and offset (zero or non-zero offset). FPGA 126 may default to known scan parameters (e.g., full field of view, a set number of scan lines and pixels per scan line, and zero offset) or may receive scan parameters from computer 128. For example, computer 128 may dynamically change the scan parameters in software to enable both coarse scanning to locate objects of interest in the full field of view and fine scanning on those objects of interest. For example, the coarse scan may encompass 0.2° to 2.0° and the fine scan may encompass 0.01° to 0.2°. Computer 128 may make this determination based on (a) a determination from a previous frame (b) an external command or (c) a predefined scan pattern evolution. It can be appreciated that the adaptive scan parameters enable the system to "zoom in" on each individual object of interest and identify the object and its position and velocity early in the scanning process, as well as provide improved spatial resolution at greater distances. FPGA 126 provides the scan parameters to mirror driver 118 to control the scanning function.

Figure 18A:
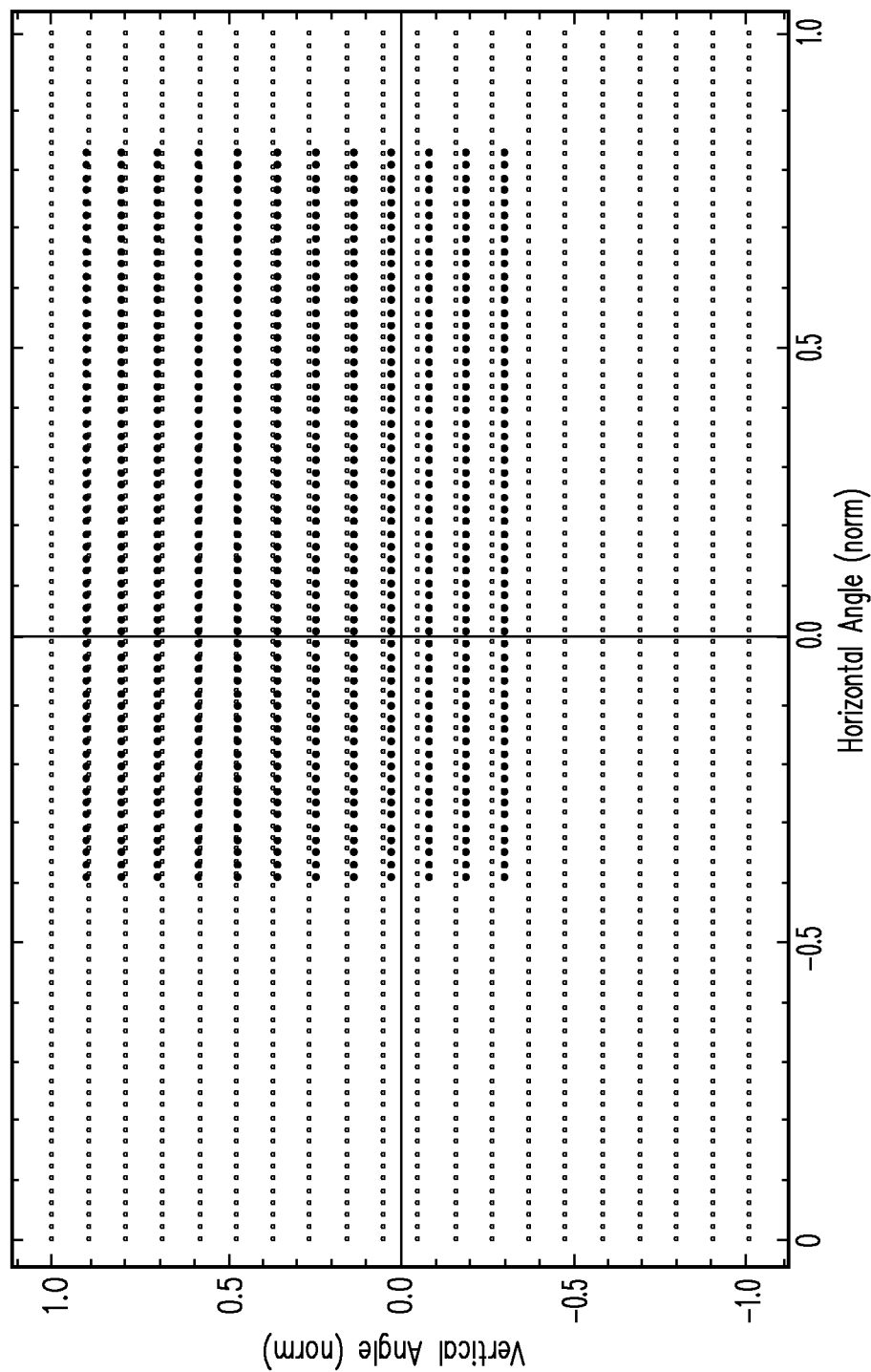
FIG. 18A illustrates example scan patterns (full scan and adaptive scan) of the MEMS mirror of FIG. 1.
Figure 18B:
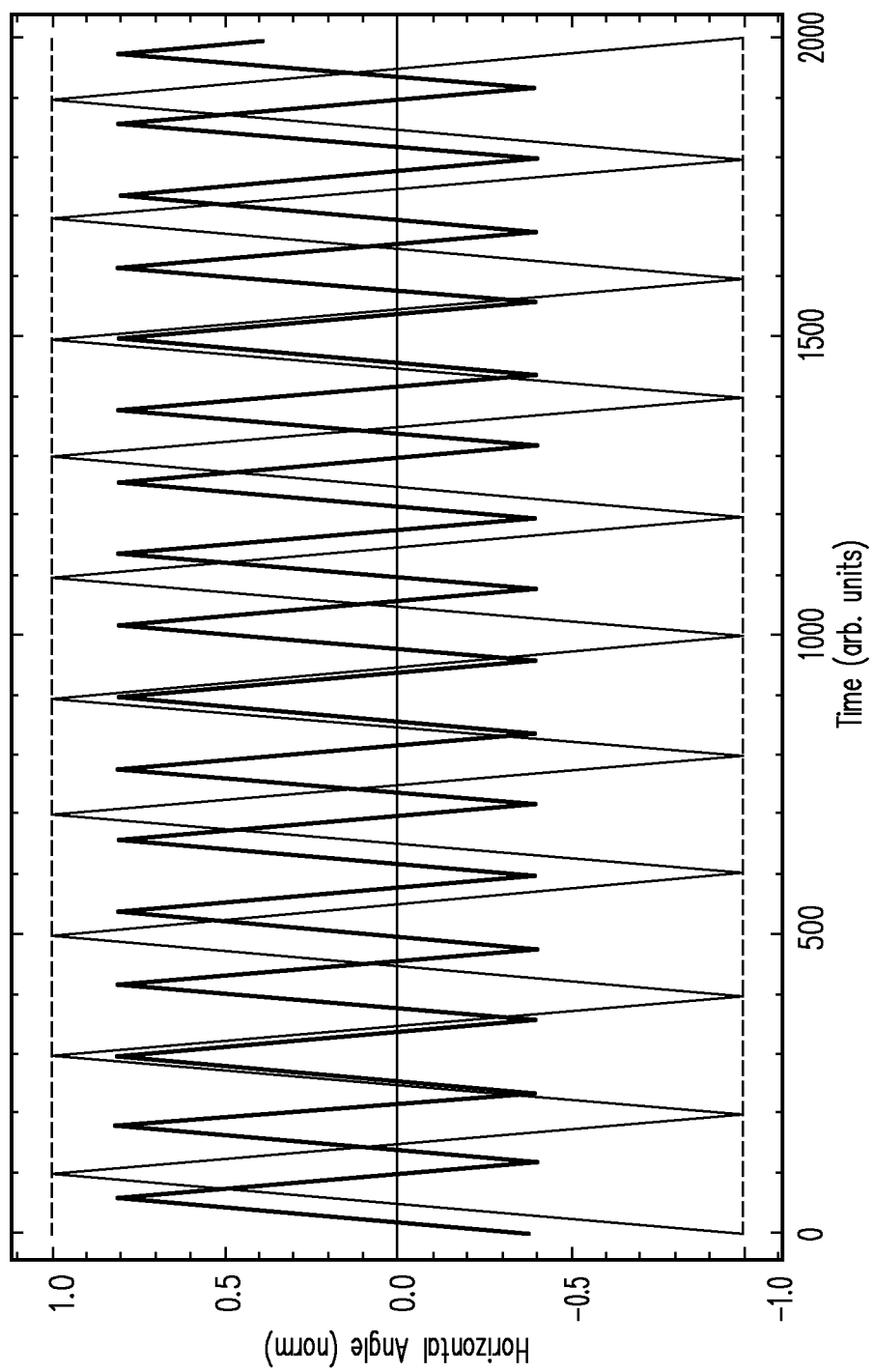
FIG. 18B illustrates the horizontal component of the scans.
Figure 18C:
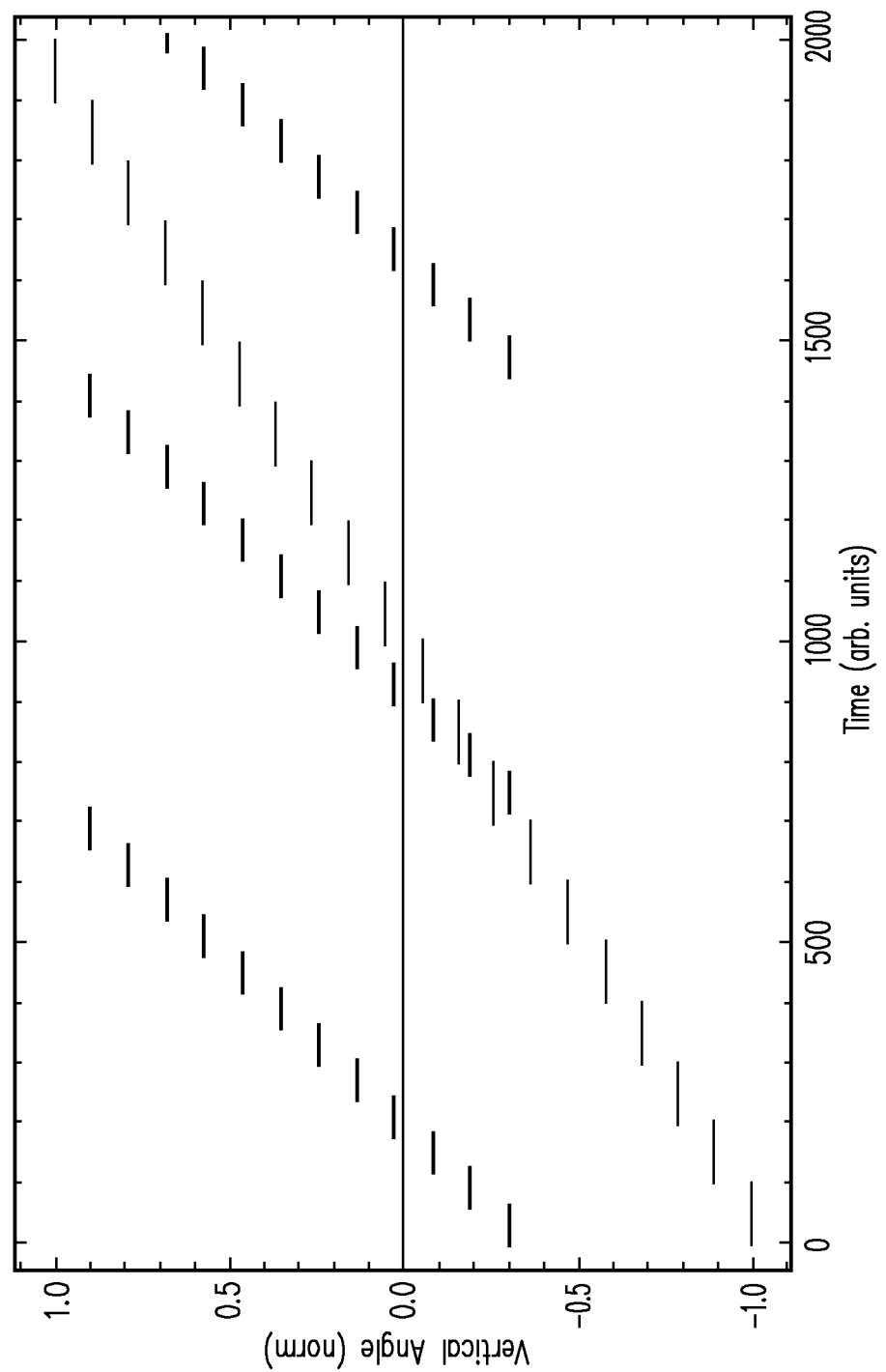
FIG. 18C illustrates the vertical component of the scans.

An example of a full scan pattern in comparison to an adaptive scan pattern is shown in FIGS. 18A-18C (note that the full scan pattern is the same as that shown in FIGS. 17A-17C). In each illustration, the full scan frame is represented in regular solid lines and the adaptive scan frame is represented in bolded solid lines. As can be seen in FIG. 18A, the full scan frame is based on a scan of 20 horizontal scan lines with 100 points per scan line and the adaptive scan frame is based on a scan of 12 scan lines with 60 points per scan line. FIGS. 18B and 18C show displacement of the modified scan pattern in two axes such that the adaptive scan frame is not centered at zero (i.e., a non-zero offset). Also, the adaptive scan can have any amplitude up to the amplitude of the full scan, as indicated by the dashed lines at the top and bottom of FIG. 18B. As such, the adaptive scanning is more robust than other types of adaptive scanning that have been used in conventional LiDAR systems.

It should be understood that the field of view for a frame can be any shape and is not limited to the rectangular shape shown in FIGS. 18A-18C. For example, if a full scan pattern identifies an object as being possibly a car, then the adaptive scan pattern may follow the shape of a typical car. Of course, this is just one example and it can be appreciated that the adaptive scan pattern may include any subset of the points within a full field of view. This will reduce the processing time required for object identification.

It should also be understood that adaptive scanning may be used beyond adaptive frame placement, e.g., it is possible to implement adaptive chirp repetition rate, chirp bandwidth, chirp configuration, dedication of additional processing power, and other parameters. In one embodiment, LiDAR system 100 uses adaptive chirp repetition rate and/or chirp bandwidth to dynamically change the maximum range, maximum velocity, range resolution, and/or velocity resolution using the equations set forth above. This approach improves the ability to identify an object after it has been initially detected. For example, assume that a wide field of view scan pattern with certain default parameters, e.g., a maximum range of two hundred (200) meters and a range resolution of four (4) centimeters, is used to determine that an object is located forty (40) meters away. In this case, the chirp pattern can be changed to "zoom in" on this object in order to obtain a range resolution of one (1) centimeter at the expense of reducing the maximum range to fifty (50) meters. This adaptive scanning would enable the system to map out the texture of the object in order to identify it as, for example, a person vs. a tree. Of course, other examples of adaptive scanning will be apparent to one skilled in the art.

B. PERFORMANCE CHARACTERISTICS OF LIDAR SYSTEM

The LiDAR system of the present invention provides performance characteristics that are not achievable with conventional ToF and FMCW LiDAR systems. Typical performance characteristics are summarized in Table 1 below:

TABLE 1

| Performance Characteristic | Value/Range |
| --- | --- |
| Maximum Range | up to 1 km (100% reflective target) |
|  | up to 200 m (10% reflective target) |
| Minimum Range | 1 mm to 1 m |
| Range Resolution | 1 mm to 20 cm |
| Maximum Velocity | 200 mph to 450 mph |
| Velocity Resolution | 0.2 mph to 2 mph |
| Number of Lasers/Detectors | 1 |
| Output Rate | 50,000-500,000 points/second |
| Output Density | 55,000-300,000 points/solid angle |
| Detector Output Density | 55,000-300,000 points/solid angle/detector |
| # of Returns | 1-3 |
| Field of View | up to 120° × 120° |
| Angular Resolution (H) | 0.02° to 1° |
| Angular Resolution (V) | 0.02° to 1° |
| Size | 10 cm$^3$ to 500 cm$^3$ |
| Transmit Optical Power | 10 mW to 3 W |
| Point-to-Point Latency | 220 µs to 100 ms |

It should be noted that the LiDAR system of the present invention is able to achieve the performance characteristics described herein with the use of a single laser. In contrast, many conventional LiDAR systems require the use of multiple lasers (e.g., sixteen (16) lasers or more) to achieve comparable performance characteristics or cannot achieve these performance characteristics at all. The LiDAR system also offers other advantages over many conventional LiDAR systems. For example, the LiDAR system is compact, lightweight and has low power consumption and, in addition, provides solid state reliability and environmental tolerance. Also, operation of the LiDAR system does not require GPS synchronization and, as such, can operate in a broad range of environments (including tunnels)—even if there is no GPS coverage. In addition, on-board data processing enables the LiDAR system to directly (simultaneously) measure both distance and velocity in real time, which provides significantly lower latency. The LiDAR system also provides an adaptive scanning function, which results in greater point density on objects of interest and provides better spatial resolution at a distance, as well as other advantages discussed above. The LiDAR system is also eye safe by virtue of its laser wavelength in the range of 1400 nm to 4000 nm (e.g., the 1530 nm to 1560 nm C-band) in combination with a lower transmitted optical power.

Further, the LiDAR system is relatively immune from interference caused by other LiDAR systems operating nearby. The probability of interference between the LiDAR system and another LiDAR system is approximately represented by the following equation:

$$P \approx \frac{\lambda^2 \times LW}{c \times \lambda_{accuracy}} \quad (9)$$

where:
P=probability of interference
λ=laser wavelength in m
LW=laser linewidth in Hz
c=speed of light (approximately 3.00×10⁸ m/sec)
$\lambda_{accuracy}$=laser wavelength accuracy in m In most cases, the probability of interference will be less than 1×10⁷. For example, assume that a 1550 nm laser has a wavelength specified to an accuracy of 0.1 nm. For a laser linewidth of 1 Hz, the probability that two 1550 nm lasers will be emitting light at the exact same frequency so as to interfere with each other can be determined using equation (9) as follows:

$$P \approx \frac{(1.55 \times 10^{-6})^2 \times (1)}{(3 \times 10^8) \times (1 \times 10^{-10})} \approx 8 \times 10^{-11} \quad (10)$$

If the wavelength of the 1550 nm laser is only specified to an accuracy of 1 nm, the probability of interference can be determined using equation (9) as follows:

$$P \approx \frac{(1.55 \times 10^{-6})^2 \times (1)}{(3 \times 10^8) \times (1 \times 10^{-9})} \approx 8 \times 10^{-12} \quad (11)$$

Of course, it should be understood that the probability of interference would be orders of magnitude higher if the linewidth of the laser were increased. For example, a laser linewidth of 400 kHz would result in a difference of almost 6 orders of magnitude. For this reason, the LiDAR system of the present invention (with its narrow linewidth laser) is relatively immune from interference. Other advantages are described herein and/or will be apparent to one skilled in the art.

C. APPLICATIONS

The LiDAR system of the present invention can be used in a variety of different systems for many applications. Because the LiDAR system is compact, lightweight and has low power consumption, it has wide application in systems where space, weight, and/or power consumption is at a premium. Examples of such applications include autonomous and semi-autonomous vehicles, remote piloted and autonomous drones, portable devices, aerospace systems, robotic systems, imaging systems, assistive devices, biomedical devices, and virtual reality (VR) systems. Other applications include agriculture, forestry, terrain mapping, meteorology, microscopy, warehouse management, construction, and structural sensors. Of course, other applications will be apparent to one skilled in the art.

In one particular application, the LiDAR system is provided in the form of one or more LiDAR sensors incorporated into an Advanced Driver Assistance System (ADAS), in which each LiDAR sensor provides highly accurate information relating to the position and/or velocity of other vehicles and road obstacles. The LiDAR sensors are compact and may be positioned in various locations on the vehicle, such as near the head lights or back lights, behind the front windshield, or any other location desired for a particular implementation. In certain implementations, the LiDAR sensors may be positioned to enable 360° viewing. The data from the LiDAR system may be combined with data from other types of sensors, such as a camera, a radar sensor, sonar, or a thermal imaging sensor.

In certain embodiments, the ADAS system uses the LiDAR system information to notify the vehicle operator (i.e., the driver) of the presence and/or proximity of other vehicles or road obstacles. Such a notification can be an audible and/or tactile alarm or warning that, for example, is transmitted through a speaker of the vehicle's audio system and/or to an earpiece worn by the vehicle operator. The notification can also be provided by a visual display that can be seen by the vehicle operator. Such a visual display can include a dedicated display for this purpose, a display of the vehicle's navigation system, a display of the vehicle's instrument cluster, a display integrated into a mirror of the vehicle, and/or a "heads up" display reflected from the interior of a vehicle window.

In other embodiments, the ADAS system uses the LiDAR system information to provide assistance to a vehicle operator in the form of automated vehicle responses. For example, the ADAS system can control the vehicle's brake system, steering system, and/or engine accelerator to change the vehicle's speed (accelerating, decelerating, braking, gear ratio, etc.) and/or direction. The automated vehicle responses can be provided following prompting of the vehicle operator or in an autonomous fashion. In some implementations, the automated vehicle responses can override control of the vehicle provided by the vehicle operator, e.g., when detected conditions meet certain criteria. Examples of such criteria include determination that the vehicle operator is incapacitated, that a detected condition can result in injury to the vehicle operator and/or a detected individual, vehicle damage or loss, or require action that is more rapid than can be provided by the vehicle operator.

In yet other embodiments, the ADAS system uses the LiDAR system information to operate the vehicle autonomously. This autonomous functionality can be at the discretion of an onboard or remote vehicle operator. If so, the vehicle can be directed by the vehicle operator during part of its operation (heavy pedestrian traffic, etc.) and operate autonomously under other conditions. In other cases, the vehicle operates wholly autonomously. Such an autonomous vehicle can be configured to carry passengers (i.e., persons not involved in operating the vehicle) or can be designed to operate without a human presence.

D. GENERAL

The description of the invention set forth above provides many embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

As used herein, the singular forms "a," "an" and "the" include plural reference unless the context clearly dictates otherwise. Also, the terms "optional" or "optionally" mean that the subsequently described component or element may or may not be present, and that the description includes embodiments in which said component or element is present and embodiments where it is not. In addition, unless the context dictates otherwise, the term "coupled to" is intended to include both direct coupling (in which two elements are directly connected to each other) and indirect coupling (in which at least one additional element is located between the two elements).

The recitation of ranges of values herein is merely intended to serve as a shorthand method of referring individually to each separate value falling within the range. Unless otherwise indicated, each individual value is incorporated into the description as if it were individually recited herein.

While the invention has been described and illustrated with reference to many embodiments, it should be understood that various modifications could be made to these embodiments without departing from the scope of the invention. Therefore, the invention is not to be limited to the specific configuration or methodology of these embodiments, except insofar as such limitations are included in the following claims.

What is claimed is:

1. A light detection and ranging (LiDAR) system, comprising:
   a laser for generating a frequency modulated optical signal comprising a series of optical chirps;
   a laser driver that controls the laser to generate the optical chirps;
   a scanning assembly that (a) transmits the optical chirps across a scanning region at an optical power in a range of 10 mW to 3 W and (b) receives reflected optical chirps that have reflected off one or more objects located within the scanning region, wherein the objects are detectable at a range of at least 200 meters from the LiDAR system; and
   an electronic data analysis assembly that generates a plurality of data points each of which comprises distance data associated with a portion of the reflected optical chirps to detect at least an object at a distance from the LiDAR system, the electronic data analysis assembly further adaptively controls the laser driver to alter a parameter of a subset of the optical chirps based on the distance to the object responsive to the detection of the object at the distance.

2. The LiDAR system of claim 1, wherein the transmitted optical power is in a range of 10 mW to 400 mW.

3. The LiDAR system of claim 1, wherein at least some of the objects have a reflectivity of 10% or more and are detectable at the range of 200 meters from the LiDAR system when the transmitted optical power is 50 mW.

4. The LiDAR system of claim 1, wherein at least some of the objects have a reflectivity of 90% or more and are detectable at a range of 600 meters from the LiDAR system when the transmitted optical power is 50 mW.

5. The LiDAR system of claim 1, wherein the distance data indicates the distance of the object that provided the portion of the reflected optical chirps relative to the LiDAR system.

6. The LiDAR system of claim 1, wherein each of the data points also comprises velocity data associated with the portion of the reflected optical chirps.

7. The LiDAR system of claim 6, wherein the velocity data associated with the portion of the reflected light indicates a velocity of the object that provided the portion of the reflected optical chirps relative to the LiDAR system.

8. The LiDAR system of claim 1, wherein a signal to noise ratio of the received optical chirps is in a range of 3 dB to 110 dB.

9. The LiDAR system of claim 1, wherein each of the optical chirps has a chirp linearity of 80% or more.

10. The LiDAR system of claim 1, wherein each of the optical chirps has a chirp linearity of 90% or more.

11. The LiDAR system of claim 1, wherein the parameter that is adaptively controlled by the electronic data analysis assembly comprises at least one of a chirp repetition rate or a chirp bandwidth.

12. The LiDAR system of claim 11, wherein the at least one of the chirp repetition rate or the chirp bandwidth are adaptively controlled to dynamically change one or more of a maximum range, a maximum velocity, a range resolution, or a velocity resolution of the LiDAR system.

13. The LiDAR system of claim 1, wherein the electronic data analysis assembly adaptively controls the laser driver to alter the parameter of the subset of the optical chirps such that a maximum range is reduced and a range resolution is decreased for the subset of the optical chirps based on the distance to the object being detected as less than 200 meters.

* * * * *